US012632928B2

(12) United States Patent
Li et al.

(10) Patent No.: US 12,632,928 B2
(45) Date of Patent: May 19, 2026

(54) IMAGE PROCESSING METHOD AND APPARATUS, COMPUTER DEVICE, AND STORAGE MEDIUM

(71) Applicant: Tencent Technology (Shenzhen) Company Limited, Shenzhen (CN)

(72) Inventors: Hao Li, Shenzhen (CN); Huanrong Zhang, Shenzhen (CN); Lei Sun, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 284 days.

(21) Appl. No.: 18/581,818

(22) Filed: Feb. 20, 2024

(65) Prior Publication Data

US 2024/0193739 A1     Jun. 13, 2024

Related U.S. Application Data

(63) Continuation of application No. PCT/CN2023/102697, filed on Jun. 27, 2023.

(30) Foreign Application Priority Data

Aug. 30, 2022     (CN) .......................... 202211049178.6

(51) Int. Cl.
| | | |
|---|---|---|
| *G06T 5/50* | (2006.01) | |
| *G06T 5/70* | (2024.01) | |

(Continued)

(52) U.S. Cl.
CPC .................. *G06T 5/50* (2013.01); *G06T 5/70* (2024.01); *G06T 7/0002* (2013.01); *G06V 10/44* (2022.01);

(Continued)

(58) Field of Classification Search
USPC ......................................... 382/195, 254, 284
See application file for complete search history.

(56) References Cited

U.S. PATENT DOCUMENTS

| | | | | |
|---|---|---|---|---|
| 8,411,938 B2 * | 4/2013 | Zhang | ........................ | G06T 5/70 |
| | | | | 382/302 |
| 10,825,160 B2 * | 11/2020 | Hu | ............................. | G06T 5/92 |

(Continued)

FOREIGN PATENT DOCUMENTS

| | | | | |
|---|---|---|---|---|
| CN | 112614064 | * 4/2021 | ............... | G06T 5/00 |

*Primary Examiner* — Ishrat I Sherali

(74) *Attorney, Agent, or Firm* — Sughrue Mion, PLLC

(57) ABSTRACT

An image processing method and apparatus, the method includes obtaining an attribute characterization of a source image and an attribute characterization of an enhanced image, the enhanced image being obtained by enhancing the source image, comparing the attribute characterization of the source image with the attribute characterization of the enhanced image to obtain attribute differences between at least part of pixel positions in the source image and corresponding at least part of pixel positions in the enhanced image, determining local fusion weights of the at least part of pixel positions in the source image based on the attribute differences and the attribute characterization of the enhanced image, determining enhanced fusion weights of the at least part of pixel positions in the enhanced image, and fusing the source image and the enhanced image to obtain a fused image.

20 Claims, 12 Drawing Sheets

(51) Int. Cl.

| | |
|---|---|
| *G06T 5/94* | (2024.01) |
| *G06T 7/00* | (2017.01) |
| *G06V 10/44* | (2022.01) |
| *G06V 10/75* | (2022.01) |
| *G06V 20/70* | (2022.01) |

(52) U.S. Cl.

CPC .............. *G06V 10/75* (2022.01); *G06V 20/70* (2022.01); *G06T 2207/20192* (2013.01); *G06T 2207/20221* (2013.01); *G06T 2207/20224* (2013.01)

(56) References Cited

U.S. PATENT DOCUMENTS

| | | | | |
|---|---|---|---|---|
| 11,250,547 | B2 * | 2/2022 | Zhang | G06V 10/30 |
| 12,328,507 | B2 * | 6/2025 | Cui | G06T 5/50 |
| 2021/0090228 | A1 * | 3/2021 | Jiang | G06T 5/70 |
| 2022/0207731 | A1 * | 6/2022 | Johnston | G06T 7/0012 |
| 2023/0360186 | A1 * | 11/2023 | Geng | G06T 5/50 |
| 2024/0127403 | A1 * | 4/2024 | Wu | G06V 10/60 |
| 2024/0135507 | A1 * | 4/2024 | Imber | G06T 3/4053 |

* cited by examiner

302

Obtain an attribute characterization of a source image and an attribute characterization of an enhanced image, the enhanced image being obtained by enhancing the source image

304

Compare the attribute characterization of the source image with the attribute characterization of the enhanced image, to obtain attribute differences between at least part of pixel positions in the source image and the at least part of pixel positions in the enhanced image

306

Generate local fusion weights of the at least part of pixel positions in the source image based on the attribute differences and the attribute characterization of the enhanced image

308

Determine enhanced fusion weights of the at least part of pixel positions in the enhanced image, a determined enhanced fusion weight of at least one pixel position being negatively correlated with a local fusion weight of the same pixel position in the source image

310

Generate a fused image of the source image and the enhanced image

FIG. 3

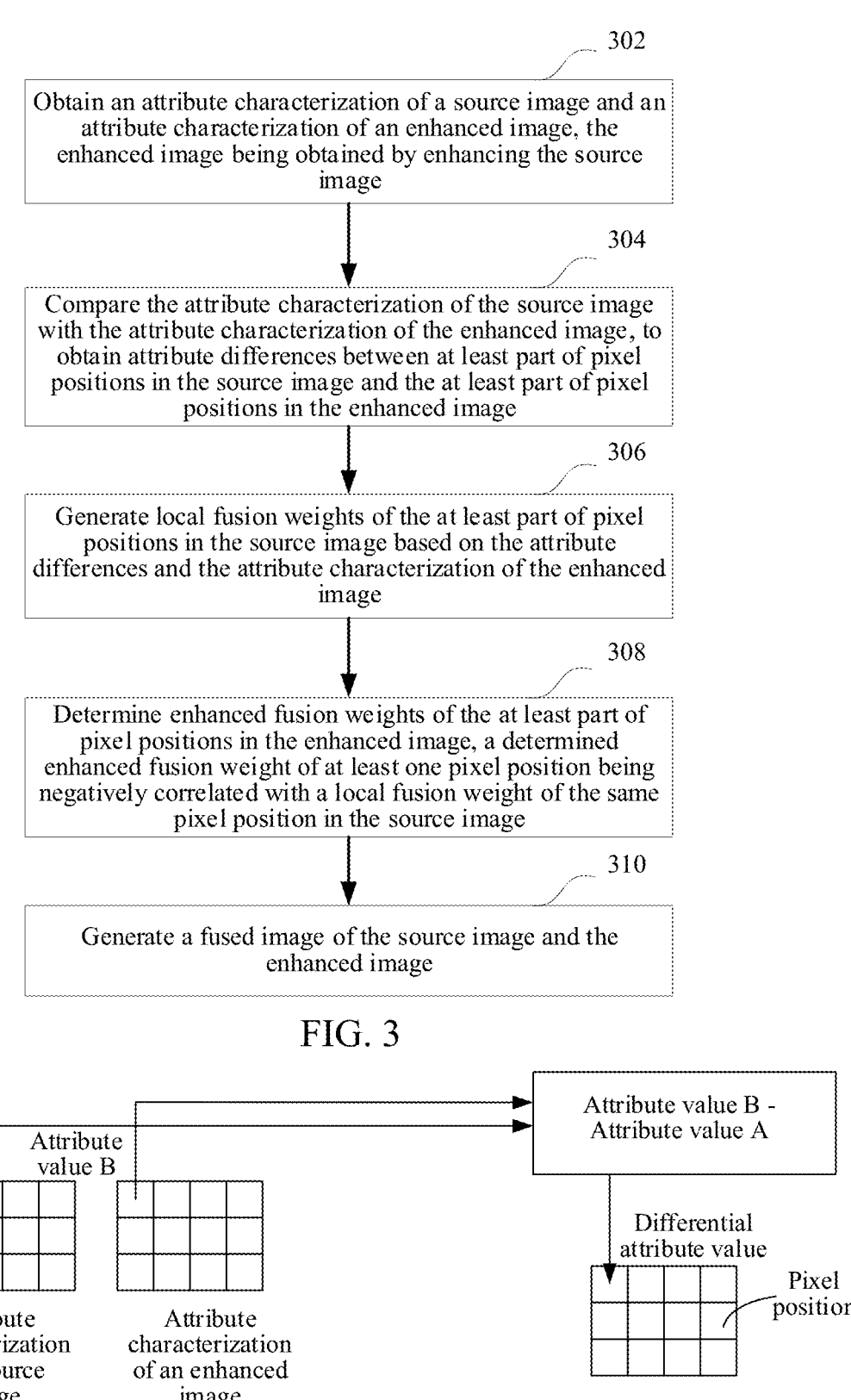

FIG. 4

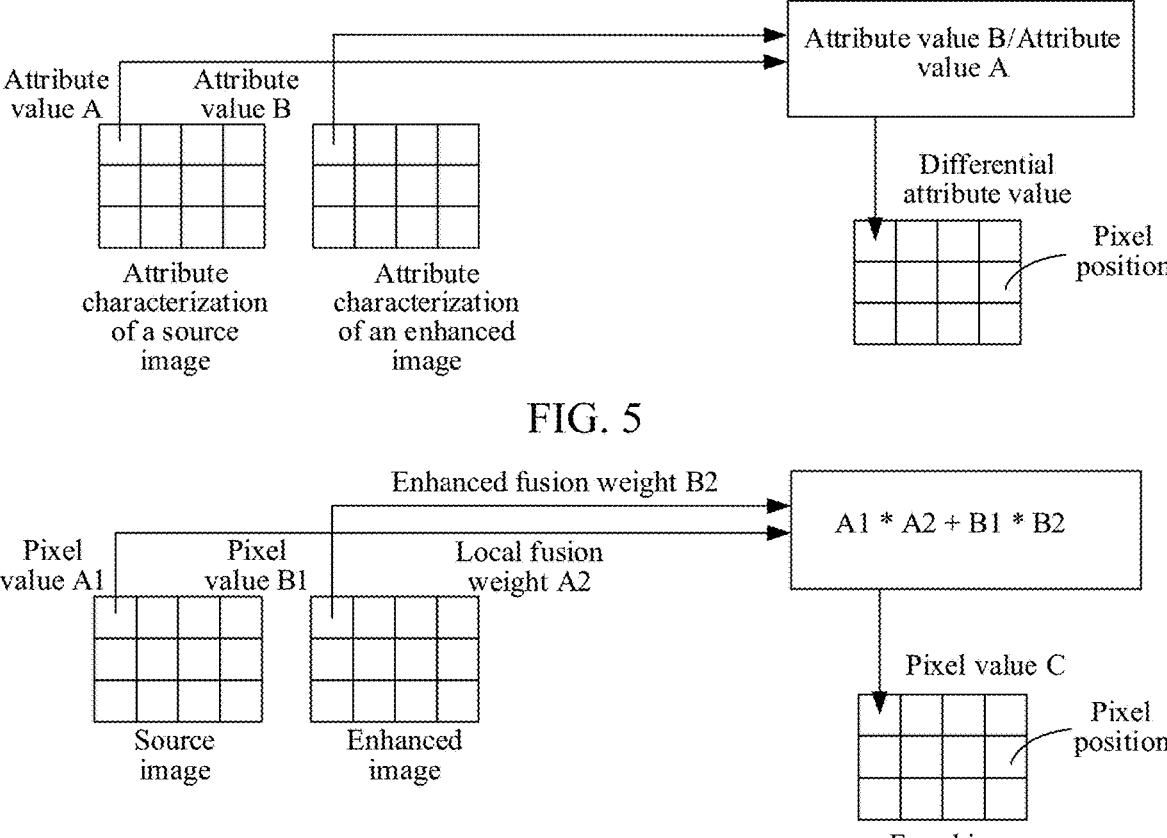
FIG. 5
FIG. 6
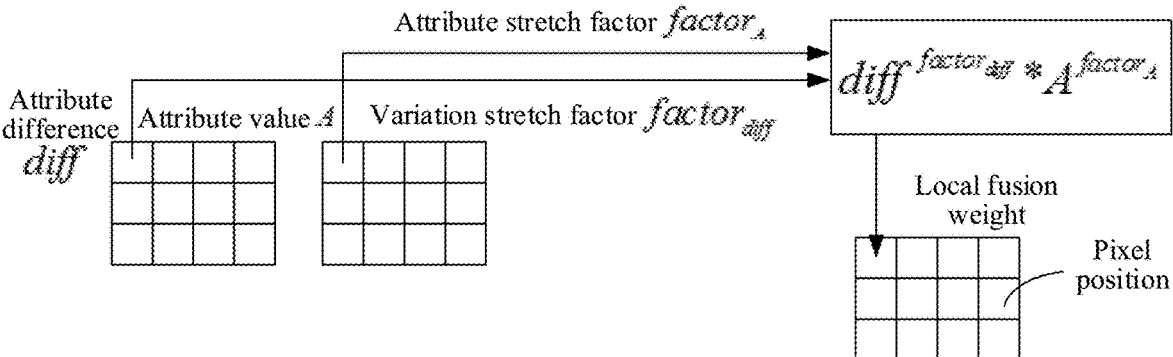
FIG. 7

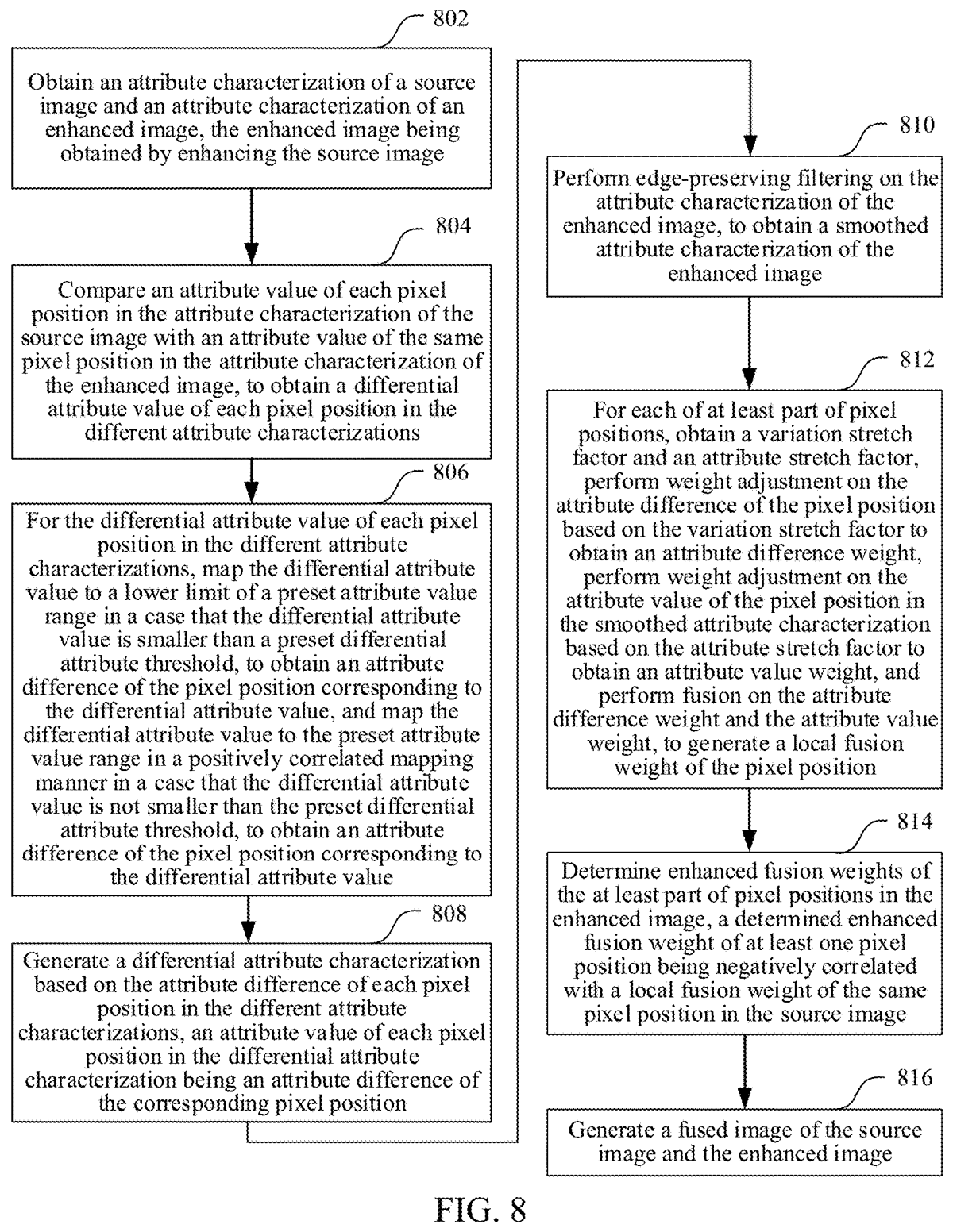

802

Obtain an attribute characterization of a source image and an attribute characterization of an enhanced image, the enhanced image being obtained by enhancing the source image

804

Compare an attribute value of each pixel position in the attribute characterization of the source image with an attribute value of the same pixel position in the attribute characterization of the enhanced image, to obtain a differential attribute value of each pixel position in the different attribute characterizations

806

For the differential attribute value of each pixel position in the different attribute characterizations, map the differential attribute value to a lower limit of a preset attribute value range in a case that the differential attribute value is smaller than a preset differential attribute threshold, to obtain an attribute difference of the pixel position corresponding to the differential attribute value, and map the differential attribute value to the preset attribute value range in a positively correlated mapping manner in a case that the differential attribute value is not smaller than the preset differential attribute threshold, to obtain an attribute difference of the pixel position corresponding to the differential attribute value

808

Generate a differential attribute characterization based on the attribute difference of each pixel position in the different attribute characterizations, an attribute value of each pixel position in the differential attribute characterization being an attribute difference of the corresponding pixel position

810

Perform edge-preserving filtering on the attribute characterization of the enhanced image, to obtain a smoothed attribute characterization of the enhanced image

812

For each of at least part of pixel positions, obtain a variation stretch factor and an attribute stretch factor, perform weight adjustment on the attribute difference of the pixel position based on the variation stretch factor to obtain an attribute difference weight, perform weight adjustment on the attribute value of the pixel position in the smoothed attribute characterization based on the attribute stretch factor to obtain an attribute value weight, and perform fusion on the attribute difference weight and the attribute value weight, to generate a local fusion weight of the pixel position

814

Determine enhanced fusion weights of the at least part of pixel positions in the enhanced image, a determined enhanced fusion weight of at least one pixel position being negatively correlated with a local fusion weight of the same pixel position in the source image

816

Generate a fused image of the source image and the enhanced image

FIG. 8

Source image

Enhancement

Enhanced image

Post-enhancement
(adaptive pixel-by-pixel
local fusion)

Final enhanced image

IMAGE PROCESSING METHOD AND APPARATUS, COMPUTER DEVICE, AND STORAGE MEDIUM

CROSS-REFERENCE TO RELATED APPLICATIONS

This application is a continuation application of International Application No. PCT/CN2023/102697, filed on Jun. 27, 2023, which claims priority to Chinese Patent Application No. 202211049178.6, filed with the China National Intellectual Property Administration on Aug. 30, 2022, the disclosures of each being incorporated by reference herein in their entireties.

FIELD

The disclosure relates to the field of image processing technologies, and in particular, to an image processing method and apparatus, a computer device, a storage medium, and a computer program product.

BACKGROUND

With the development of image processing technologies, a post-enhancement technology appears. The post-enhancement technology is used for further enhancement of an image and is a supplement to image enhancement, to achieve a better enhancement effect. Image enhancement refers to improving a source image in one or more image attribute dimensions such as lightness, hue, contrast, and sharpness, so that a processed output image is enhanced in image quality.

In conventional technologies, during post-enhancement, global fusion is performed on a source image and an enhanced image based on a designed fusion factor, to obtain a fused image, that is, a post-enhanced image. However, the conventional technologies produce poor enhancement effects.

SUMMARY

Some embodiments provide an image processing method and apparatus, a computer device, a computer-readable storage medium, and a computer program product are provided.

Some embodiments provide an image processing method, performed by a computer device, and including: obtaining an attribute characterization of a source image and an attribute characterization of an enhanced image, the enhanced image being obtained by enhancing the source image; comparing the attribute characterization of the source image with the attribute characterization of the enhanced image to obtain attribute differences between at least part of pixel positions in the source image and corresponding at least part of pixel positions in the enhanced image; determining local fusion weights of the at least part of pixel positions in the source image based on the attribute differences and the attribute characterization of the enhanced image; determining enhanced fusion weights of the at least part of pixel positions in the enhanced image, a determined enhanced fusion weight of at least one pixel position being negatively correlated with a local fusion weight of the same pixel position in the source image; and fusing the source image and the enhanced image to obtain a fused image.

Some embodiments provide an image processing apparatus, including: at least one memory configured to store program code; and at least one processor configured to read the program code and operate as instructed by the program code, the program code comprising: attribute characterization obtaining code configured to cause at least one of the at least one processor to obtain an attribute characterization of a source image and an attribute characterization of an enhanced image, the enhanced image being obtained by enhancing the source image; attribute characterization comparing code configured to cause at least one of the at least one processor to compare the attribute characterization of the source image with the attribute characterization of the enhanced image to obtain attribute differences between at least part of pixel positions in the source image and corresponding at least part of pixel positions in the enhanced image; local fusion weight generating code configured to cause at least one of the at least one processor to determine local fusion weights of the at least part of pixel positions in the source image based on the attribute differences and the attribute characterization of the enhanced image; enhanced fusion weight generating code configured to cause at least one of the at least one processor to determine enhanced fusion weights of the at least part of pixel positions in the enhanced image, a determined enhanced fusion weight of at least one pixel position being negatively correlated with a local fusion weight of the same pixel position in the source image; and fused image generating code configured to cause at least one of the at least one processor to generate a fused image of the source image and the enhanced image.

Some embodiments provide a non-transitory computer-readable storage medium storing computer code which, when executed by at least one processor, causes the at least one processor to at least: obtain an attribute characterization of a source image and an attribute characterization of an enhanced image, the enhanced image being obtained by enhancing the source image; compare the attribute characterization of the source image with the attribute characterization of the enhanced image to obtain attribute differences between at least part of pixel positions in the source image and corresponding at least part of pixel positions in the enhanced image; determine local fusion weights of the at least part of pixel positions in the source image based on the attribute differences and the attribute characterization of the enhanced image; determine enhanced fusion weights of the at least part of pixel positions in the enhanced image, a determined enhanced fusion weight of at least one pixel position being negatively correlated with a local fusion weight of the same pixel position in the source image; and fuse the source image and the enhanced image to obtain a fused image.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

FIG. 3 is a flowchart of an image processing method according to some embodiments.

FIG. 4 is a schematic diagram of comparing attribute values of pixel positions in attribute characterizations according to some embodiments.

FIG. 5 is a schematic diagram of comparing attribute values of pixel positions in attribute characterizations according to some embodiments.

FIG. 6 is a schematic diagram of generating pixel values of pixel positions in a fused image according to some embodiments.

FIG. 7 is a schematic diagram of generating a local fusion weight according to some embodiments.

FIG. 8 is a flowchart of an image processing method according to some embodiments.

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure and the appended claims.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

Figure 1:
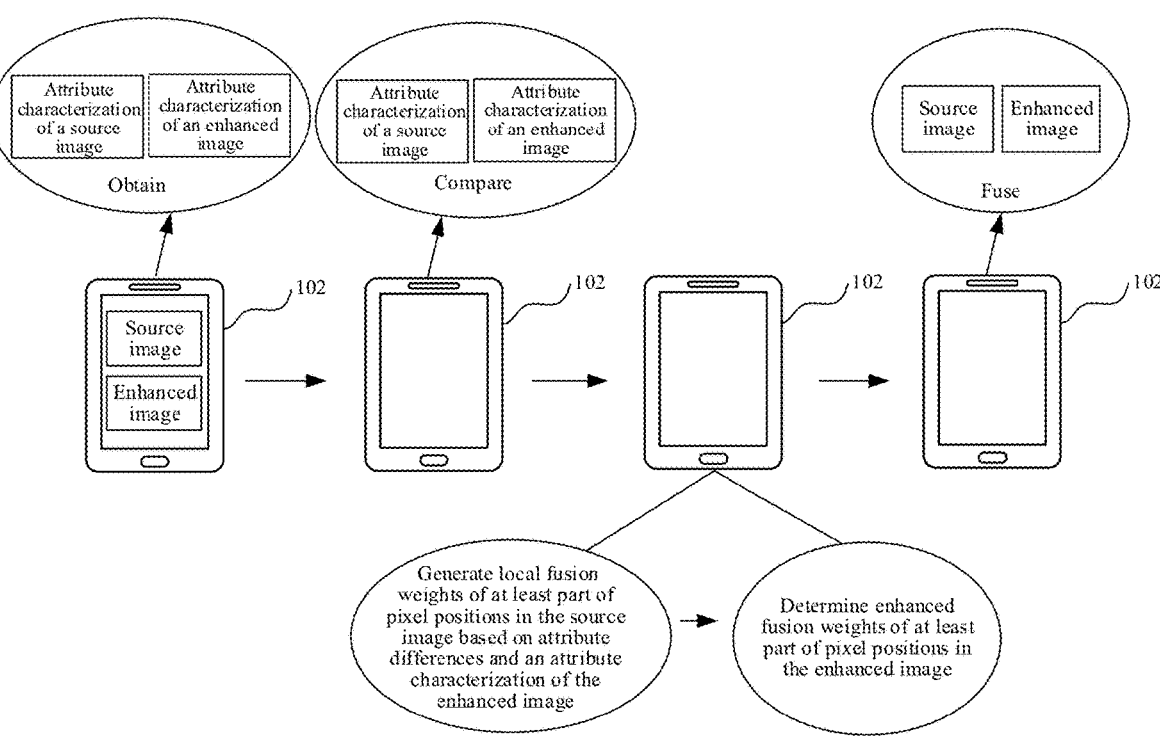
FIG. 1 is a diagram of an application environment of an image processing method according to some embodiments.

An image processing method provided in some embodiments may be applied to an application environment shown in FIG. 1. A terminal 102 obtains an attribute characterization of a source image and an attribute characterization of an enhanced image, the enhanced image being obtained by enhancing the source image, compares the attribute characterization of the source image with the attribute characterization of the enhanced image, to obtain attribute differences between at least part of pixel positions in the source image and the at least part of pixel positions in the enhanced image, generates local fusion weights of the at least part of pixel positions in the source image based on the attribute differences and the attribute characterization of the enhanced image, determines enhanced fusion weights of the at least part of pixel positions in the enhanced image, a determined enhanced fusion weight of at least one pixel position being negatively correlated with a local fusion weight of the same pixel position in the source image, and generates a fused image of the source image and the enhanced image. The terminal 102 may be, but is not limited to, a desktop computer, a laptop, a smartphone, a tablet, an Internet of Things device, or a portable wearable device. The Internet of Things device may be a smart speaker, a smart television, a smart air conditioner, a smart vehicle-mounted device, or the like. The portable wearable device may be a smartwatch, a smart band, a head-mounted device, or the like.

Figure 2:
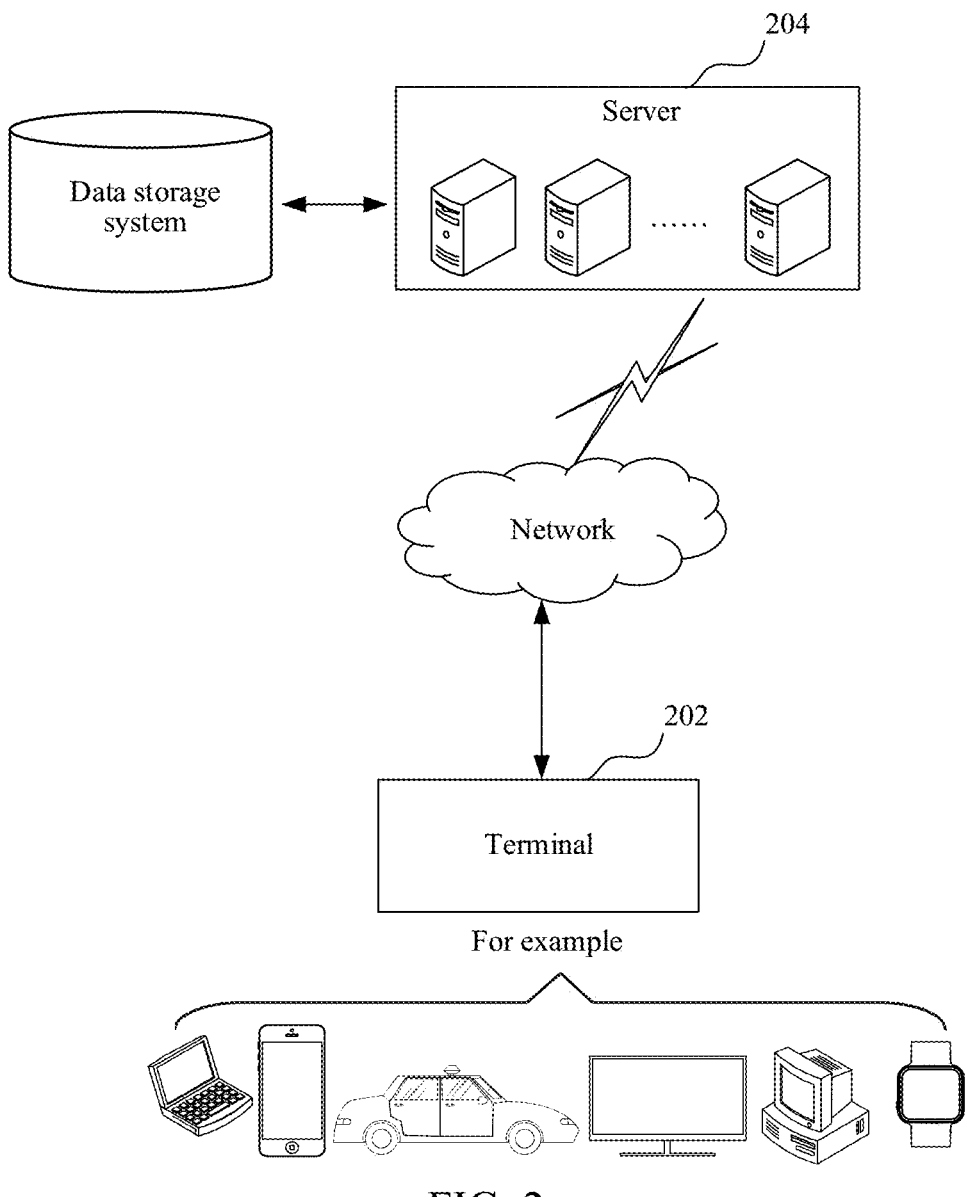
FIG. 2 is a diagram of an application environment of an image processing method according to some embodiments.

An image processing method provided in some embodiments may be applied to an application environment shown in FIG. 2. A terminal 202 communicates with a server 204 through a network. A data storage system may store data that the server 204 needs to process. The data storage system may be integrated on the server 204, or on a cloud or another server. A source image and an enhanced image are stored on the terminal 202. The server 204 obtains the source image and the enhanced image from the terminal 202, obtains an attribute characterization of the source image and an attribute characterization of the enhanced image, the enhanced image being obtained by enhancing the source image, compares the attribute characterization of the source image with the attribute characterization of the enhanced image, to obtain attribute differences between at least part of pixel positions in the source image and the at least part of pixel positions in the enhanced image, generates local fusion weights of the at least part of pixel positions in the source image based on the attribute differences and the attribute characterization of the enhanced image, determines enhanced fusion weights of the at least part of pixel positions in the enhanced image, a determined enhanced fusion weight of at least one pixel position being negatively correlated with a local fusion weight of the same pixel position in the source image, and generates a fused image of the source image and the enhanced image. The terminal 202 may be, but is not limited to, a desktop computer, a laptop, a smartphone, a tablet, an Internet of Things device, or a portable wearable device. The Internet of Things device may be a smart speaker, a smart television, a smart air conditioner, a smart vehicle-mounted device, or the like. The portable wearable device may be a smartwatch, a smart band, a head-mounted device, or the like. The server 204 may be implemented by using an independent server, a server cluster that includes a plurality of servers, or a cloud server, and may alternatively be a node on a blockchain.

In some embodiments, as shown in FIG. 3, an image processing method is provided, which may be independently performed by a terminal or a server, or may be jointly performed by the terminal and the server. In some embodiments, the method is applied to a terminal. The method includes the following operations:

Operation 302: Obtain an attribute characterization of a source image and an attribute characterization of an enhanced image, the enhanced image being obtained by enhancing the source image.

The source image refers to an original image that is not enhanced. For example, the source image may refer to an image acquired by an electronic device. In some embodiments, the source image may refer to an image acquired by a camera, a scanner, or the like. In some embodiments, the source image may refer to an original video frame that is not enhanced in video data. The enhanced image refers to an image obtained by enhancing the source image to enhance useful information in the source image. Enhancement may be a distortion process for improving a visual effect of a source image in an application scenario in which an image is given. In some embodiments, the enhanced image refers to an image obtained by improving the source image in one or more image attribute dimensions such as lightness, hue, contrast, and sharpness. The enhancement may be implemented by two methods: a frequency domain method, in which an image is regarded as a two-dimensional signal, two-dimensional Fourier transformation-based signal enhancement is performed on the image, a low-pass filter (that is, allowing only low-frequency signals to pass) method is used to remove noise in an image, and a high-pass filter method is used to enhance a high-frequency signal such as an edge, to make a blurry picture clear; and a spatial domain method. Representative algorithms in the spatial domain method include a local means algorithm, a median filter algorithm (taking a medium pixel value in a local neighboring region) method, and the like. These algorithms may be used for removing or reducing noise.

An image attribute refers to an inherent feature of an image. For example, the image attribute may be lightness. Lightness refers to a lightness value of an image color, and is a perception of the intensity of lightness or darkness of an object by human eyes. For another example, the image attribute may be hue. Hue refers to relative lightness or darkness of an image, and is represented as color on a color image. For still another example, the image attribute may be contrast. Contrast is a measure of the difference in lightness between lightest and darkest regions in an image, a larger difference range indicates a greater contrast, a smaller difference range indicates a smaller contrast.

An attribute characterization refers to information that can characterize an image attribute. For example, the attribute characterization may be an image that can characterize an image attribute, that is, an attribute characterization image. For example, in a case that the image attribute is lightness, the attribute characterization refers to an image that can characterize lightness. In some embodiments, the attribute characterization may be a grayscale image that characterizes lightness. In some embodiments, the attribute characterization may be a V-channel image in an HSV (Hue, Saturation, Value) color model that characterizes lightness. In some embodiments, the attribute characterization may be an L-channel image in a LAB color model. In the LAB color model, L represents lightness, and A and B are two color channels. A includes colors from dark green (low lightness value) to gray (medium lightness value) to bright pink (high lightness value), and B includes colors from bright blue (low lightness value) to gray (medium lightness value) to yellow (high lightness value).

For example, in a case that the image attribute is hue, the attribute characterization refers to an image that can characterize hue. In some embodiments, the attribute characterization may be an H-channel image in an HSV color model. In some embodiments, the attribute characterization may be an image obtained by combining channel A and channel B in a LAB color model. For example, in a case that the image attribute is contrast, the attribute characterization refers to an image that can characterize contrast. For another example, an attribute value of each pixel position in an image that characterizes contrast may be obtained by calculating a difference between a pixel value of the pixel position and an average pixel value. For still another example, an attribute value of each pixel position may alternatively be obtained by calculating a difference between a maximum pixel value and a minimum pixel value of a local neighboring region of the pixel position. A size of the local neighboring region may be configured according to an actual application scenario.

In some embodiments, the terminal obtains an attribute characterization of the source image and an attribute characterization of the enhanced image based on an image attribute of interest. In some embodiments, the attribute characterization of the source image and the attribute characterization of the enhanced image obtained by the terminal may be of the same type of image attribute. The attribute characterization may be, in some embodiments, an attribute characterization image. In some embodiments, the image attribute of interest may be configured according to an actual application scenario. For example, the image attribute of interest may be at least one of lightness, hue, and contrast.

In some embodiments, in a case that the image attribute of interest is lightness, the terminal obtains an attribute characterization of the source image and an attribute characterization of the enhanced image with respect to lightness. The attribute characterization may be, in some embodiments, a grayscale image, or may be a V-channel image in an HSV color model, or may be an L-channel image in a LAB color model. The attribute characterization that characterizes lightness is not limited in the embodiments.

In some embodiments, the attribute characterization is a grayscale image. The terminal may separately perform grayscale transformation on the source image and the enhanced image, to obtain a grayscale image of the source image and a grayscale image of the enhanced image. Grayscale transformation is a method that changes the grayscale value of each pixel in the source image point by point based on a specific transformation relationship and according to a specific target condition, to improve image quality and make an image displayed clearer. The grayscale transformation is not limited in the embodiments, and may be either linear transformation or nonlinear transformation, as long as the grayscale transformation can be implemented.

In some embodiments, the attribute characterization is a V-channel image in an HSV color model. The terminal may separately transform the source image and the enhanced image into an HSV format, to obtain a V-channel image of the source image and a V-channel image of the enhanced image. In some embodiments, the attribute characterization is an L-channel image in a LAB color model. The terminal may separately transform the source image and the enhanced image into a LAB format, to obtain an L-channel image of the source image and an L-channel image of the enhanced image.

Operation 304: Compare the attribute characterization of the source image with the attribute characterization of the enhanced image, to obtain attribute differences between at least part of pixel positions in the source image and the at least part of pixel positions in the enhanced image.

The attribute difference is used for describing a degree of attribute difference between a pixel position in the source image and the same pixel position in the enhanced image. For example, in a case that the attribute characterization is a grayscale image that characterizes lightness, the attribute difference describes a degree of grayscale value difference between a pixel position in the source image and the same pixel position in the enhanced image. For another example, in a case that the attribute characterization is an image that characterizes contrast, the attribute difference describes a degree of contrast difference between a pixel position in the source image and the same pixel position in the enhanced image.

In some embodiments, the terminal compares an attribute value of each pixel position in the attribute characterization of the source image and an attribute value of the same pixel position in the attribute characterization of the enhanced image. Through the comparison, a difference between attribute values of each pixel position can be extracted, to obtain a differential attribute value of each pixel position in the different attribute characterizations, so as to obtain attribute differences between at least part of pixel positions in the source image and the at least part of pixel positions in the enhanced image based on the differential attribute value of each pixel position.

In some embodiments, during comparing the attribute value of each pixel position in the attribute characterization of the source image with the attribute value of the same pixel position in the attribute characterization of the enhanced image, the terminal may compare the attribute value of each pixel position in the attribute characterization of the source image with the attribute value of the same pixel position in the attribute characterization of the enhanced image by subtraction, to obtain a differential attribute value of each pixel position in the different attribute characterizations. In some embodiments, as shown in FIG. 4, the comparison is performed by subtracting an attribute value A of the first pixel position in the attribute characterization of the source image from an attribute value B of the first pixel position in the attribute characterization of the enhanced image, to obtain a differential attribute value of the first pixel position.

In some embodiments, the terminal may alternatively compare the attribute value of each pixel position in the attribute characterization of the source image with the attribute value of the same pixel position in the attribute characterization of the enhanced image by division, to obtain the differential attribute value of each pixel position in the different attribute characterizations. In some embodiments, as shown in FIG. 5, the comparison is performed by dividing an attribute value B of the first pixel position in the attribute characterization of the enhanced image by an attribute value A of the first pixel position in the attribute characterization of the source image, to obtain a differential attribute value of the first pixel position.

Operation 306: Generate local fusion weights of the at least part of pixel positions in the source image based on the attribute differences and the attribute characterization of the enhanced image.

Weight refers to the importance of a factor or an indicator with respect to a specific thing.

For each of the at least part of pixel positions, a local fusion weight of the pixel position indicates the weight of a pixel value of the pixel position in the source image during weighted fusion when weighted fusion is performed on the pixel value of the pixel position in the source image and a pixel value of the pixel position in the enhanced image, and is used for representing importance of the pixel value of the pixel position in the source image with respect to the weighted fusion.

In some embodiments, the terminal generates local fusion weights of the at least part of pixel positions in the source image based on attribute differences of the at least part of pixel positions and attribute values of the at least part of pixel positions in the attribute characterization of the enhanced image. In some embodiments, for each of the at least part of pixel positions, the terminal generates a local fusion weight of the pixel position based on an attribute difference of the pixel position and an attribute value of the pixel position in the attribute characterization of the enhanced image. In other words, respective local fusion weights of a plurality of pixel positions in the source image are generated.

In some embodiments, the terminal performs fusion on the attribute difference of the pixel position and the attribute value of the pixel position in the attribute characterization of the enhanced image, to generate a local fusion weight of the pixel position. The fusion may be, in some embodiments, implemented by multiplying the attribute difference of the pixel position and the attribute value of the pixel position in the attribute characterization of the enhanced image. In some embodiments, during performing fusion on the attribute difference of the pixel position and the attribute value of the pixel position, the terminal first performs weight adjustment on the attribute difference of the pixel position and the attribute value of the pixel position separately to increase or reduce importance of the attribute difference and the attribute value, and then performs fusion on the attribute difference and attribute value undergone weight adjustment, to generate a local fusion weight of the pixel position.

In some embodiments, the terminal may perform weight adjustment on an attribute difference of a pixel position and an attribute value of the pixel position by using a pre-configured stretch factor. The pre-configured stretch factor may be configured according to an actual application scenario, and is not specifically limited herein. For example, the pre-configured stretch factor may be any value from 0 to 1.

Operation 308: Determine enhanced fusion weights of the at least part of pixel positions in the enhanced image, a determined enhanced fusion weight of at least one pixel position being negatively correlated with a local fusion weight of the same pixel position in the source image.

For each of the at least part of pixel positions, an enhanced fusion weight of the pixel position indicates the weight of a pixel value of the pixel position in the enhanced image during weighted fusion when weighted fusion is performed on a pixel value of the pixel position in the source image and the pixel value of the pixel position in the enhanced image, and is used for representing importance of the pixel value of the pixel position in the enhanced image with respect to the weighted fusion.

In some embodiments, the terminal determines the enhanced fusion weights of the at least part of pixel positions in the enhanced image based on the local fusion weights of the at least part of pixel positions in the source image, a determined enhanced fusion weight of at least one pixel position being negatively correlated with a local fusion weight of the same pixel position in the source image.

In some embodiments, for each of the at least part of pixel positions, the terminal determines an enhanced fusion weight of the pixel position in the enhanced image based on the local fusion weight of the pixel position in the source image, the determined enhanced fusion weight of the pixel position being negatively correlated with the local fusion weight of the same pixel position (that is, the pixel position) in the source image. In other words, respective enhanced fusion weights of a plurality of pixel positions in the enhanced image are determined.

In some embodiments, a sum of a local fusion weight and an enhanced fusion weight of each pixel position is pre-configured. Therefore, the enhanced fusion weight of the pixel position (that is, the same pixel position) in the enhanced image can be obtained by subtracting the local fusion weight of the pixel position in the source image from the pre-configured sum. For example, the pre-configured sum may be 1. The enhanced fusion weight of the pixel position (that is, the same pixel position) in the enhanced image can be obtained by subtracting the local fusion weight of the pixel position in the source image from 1.

Operation 310: Generate a fused image of the source image and the enhanced image.

The fused image refers to an image obtained by fusing the source image and the enhanced image. For example, the fused image may be, in some embodiments, an image obtained by performing weighted fusion on pixel values of the at least part of pixel positions in the source image and pixel values of the at least part of pixel positions in the enhanced image.

In some embodiments, the terminal generates the fused image of the source image and the enhanced image. For each of the at least part of pixel positions, a pixel value of the pixel position of the fused image is obtained by performing weighted fusion on a pixel value of the pixel position in the source image and a pixel value of the pixel position in the enhanced image based on the local fusion weight and the enhanced fusion weight of the pixel position. In other words, a unique fusion value is used for each of the at least part of pixel positions. In this way, image fusion can be implemented more flexibly.

In some embodiments, for each of the at least part of pixel positions, a pixel value of the pixel position in the fused image is a sum of a product of a local fusion weight and a pixel value of the pixel position in the source image and a product of an enhanced fusion weight and a pixel value of the pixel position in the enhanced image. In other words, the pixel value of the pixel position in the fused image equals to the local fusion weight multiplied by the pixel value of the pixel position in the source image plus the enhanced fusion weight multiplied by the pixel value of the pixel position in the enhanced image. In some embodiments, as shown in FIG. 6, a pixel value C of the first pixel position in the fused image equals to a local fusion weight A2 multiplied by a pixel value A1 of the first pixel position in the source image plus an enhanced fusion weight B2 multiplied by a pixel value B1 of the first pixel position in the enhanced image.

According to the foregoing image processing method, the attribute characterization of the source image and the attribute characterization of the enhanced image are obtained, and the attribute characterization of the source image is compared with the attribute characterization of the enhanced image, to obtain an attribute varying trend of from the source image to the enhanced image, so as to obtain attribute differences between the at least part of pixel positions in the source image and the at least part of pixel positions in the enhanced image. In this way, based on the attribute differences of the at least part of pixel positions and the attribute characterization of the enhanced image, adaptive fusion weight calculation can be performed to generate local fusion weights of the at least part of pixel positions in the source image, so that enhanced fusion weights of the at least part of pixel positions in the enhanced image can be determined, to generate the fused image of the source image and the enhanced image. In the whole process, the local fusion weight is generated according to the attribute varying trend from the source image to the enhanced image. Image fusion is implemented by using the local fusion weight of each pixel, so that enhancement effect is improved.

In some embodiments, the comparing the attribute characterization of the source image with the attribute characterization of the enhanced image, to obtain attribute differences between at least part of pixel positions in the source image and the at least part of pixel positions in the enhanced image includes:

comparing an attribute value of each pixel position in the attribute characterization of the source image with an attribute value of the same pixel position in the attribute characterization of the enhanced image, to obtain a differential attribute value of each pixel position in the different attribute characterizations; and generating a differential attribute characterization based on a differential attribute value of each pixel position in the different attribute characterizations. Attribute values of the at least part of pixel positions in the differential attribute characterization characterize the attribute differences between the at least part of pixel positions of the source image and the at least part of pixel positions of the enhanced image.

The differential attribute value refers to a difference between attribute values of each pixel position in the different attribute characterizations, that is, a difference between the attribute value of each pixel position in the attribute characterization of the source image and the attribute value of the pixel position in the attribute characterization of the enhanced image. For example, the differential attribute value may, in some embodiments, refer to a difference in the attribute values of each pixel position in the different attribute characterizations. For another example, the differential attribute value may, in some embodiments, refer to a ratio of the attribute value of each pixel position in the different attribute characterizations. For yet another example, the differential attribute value may, in some embodiments, refer to an absolute value of a difference in the attribute values of each pixel position in the different attribute characterizations. For example, in a case that the attribute characterization is a grayscale image, the differential attribute value may be, in some embodiments, a difference in grayscale values of each pixel position in different grayscale images. The difference may be a difference in the grayscale values, and may alternatively be a ratio of the grayscale value.

In some embodiments, the terminal compares an attribute value of each pixel position in the attribute characterization of the source image and an attribute value of the same pixel position in the attribute characterization of the enhanced image. Through comparison, a difference between the attribute value of each pixel position and the attribute value of the same pixel position can be extracted, to analyze a degree of attribute difference between each pixel position in the source image and the same pixel position in the enhanced image based on the differential attribute value of each pixel position, to obtain a differential attribute characterization. The differential attribute characterization includes a differential attribute value of each pixel position. Differential attribute values of the at least part of pixel positions in the differential attribute characterization characterize the attribute differences between the at least part of pixel positions in the source image and the at least part of pixel positions in the enhanced image.

In some embodiments, the terminal can compare the attribute value of each pixel position in the attribute characterization of the source image with the attribute value of the same pixel position in the attribute characterization of the enhanced image by subtraction, to obtain the differential attribute value of each pixel position in the different attribute characterizations. In some embodiments, for each pixel position, the terminal subtracts the attribute value of the pixel position in the attribute characterization of the source image from the attribute value of a pixel position in the attribute characterization of the enhanced image, to obtain a differential attribute value of each pixel position in the different attribute characterizations.

In some embodiments, when the attribute value of each pixel position in the attribute characterization of the source image is compared with the attribute value of the same pixel position in the attribute characterization of the enhanced image by subtraction, in a case that the image attribute is lightness or contrast, an obtained differential attribute value is a difference in attribute values. In a case that the image attribute is hue, the obtained differential attribute value is an absolute value of the difference between the attribute values. The absolute value of the difference between the attribute values can describe a degree of variation between the hue of a pixel position.

In some embodiments, the terminal can compare the attribute value of each pixel position in the attribute characterization of the source image with the attribute value of the same pixel position in the attribute characterization of the enhanced image by division, to obtain the differential attribute value of each pixel position in the different attribute characterizations. In some embodiments, for each pixel position, the terminal divides the attribute value of a pixel position in the attribute characterization of the source image by the attribute value of the pixel position in the attribute characterization of the enhanced image, to obtain a differential attribute value of each pixel position in the different attribute characterizations.

In some embodiments, the attribute value of each pixel position in the attribute characterization of the source image is compared with the attribute value of the pixel position in the attribute characterization of the enhanced image to extract the difference between attribute values of each pixel position, to obtain the differential attribute value of each pixel position in the different attribute characterizations, so as to analyze the degree of attribute difference between each pixel position in the source image and the pixel position in the enhanced image based on the differential attribute value of each pixel position, to obtain the differential attribute characterization.

In some embodiments, the generating a differential attribute characterization based on the differential attribute value of each pixel position in the different attribute characterizations includes:

mapping the differential attribute value of each pixel position in the different attribute characterizations to a preset attribute value range, to obtain an attribute difference of each pixel position in the different attribute characterizations; and generating the differential attribute characterization based on the attribute difference of each pixel position in the different attribute characterizations, an attribute value of each pixel position in the differential attribute characterization being an attribute difference of the corresponding pixel position.

The preset attribute value range is a pre-configured range used for performing standardization processing on the differential attribute value. The preset attribute value range may be configured according to an actual application scenario. For example, the preset attribute value range may range from 0 to 1.

In some embodiments, a differential attribute value of each pixel position in different attribute characterizations may differ in the order of magnitude. To eliminate an impact of the difference in the order of magnitude on the generation of local fusion weights, the terminal maps a differential attribute value of each pixel position in the different attribute characterizations to the preset attribute value range, to cause the differential attribute value of each pixel position in the different attribute characterizations to be in the same order of magnitude, and obtain the attribute difference of each pixel position in the different attribute characterizations, so that a differential attribute characterization may be generated based on the attribute difference of each pixel position in the different attribute characterizations. The attribute value of each pixel position in the differential attribute characterization is the attribute difference of the corresponding pixel position.

In some embodiments, the terminal subtracts a noise threshold from the differential attribute value of each pixel position in the different attribute characterizations first, to remove useless fluctuation noise, and then maps the differential attribute value, from which the noise threshold is subtracted, to the preset attribute value range, and obtains the attribute difference of each pixel position in the different attribute characterizations.

In some embodiments, the mapping the differential attribute value of each pixel position in the different attribute characterizations to a preset attribute value range, to obtain an attribute difference of each pixel position in the different attribute characterizations includes:

for the differential attribute value of each pixel position in the different attribute characterizations, mapping the differential attribute value to a lower limit of the preset attribute value range in a case that the differential attribute value is smaller than a preset differential attribute threshold, to obtain an attribute difference of the pixel position corresponding to the differential attribute value; and mapping the differential attribute value to the preset attribute value range in a positively correlated mapping manner in a case that the differential attribute value is not smaller than the preset differential attribute threshold, to obtain an attribute difference of the pixel position corresponding to the differential attribute value.

The preset differential attribute threshold may be configured according to an actual application scenario. For example, the preset differential attribute threshold may be configured depending on the manner of comparison of the image attribute and the attribute value. For different combinations of manners of comparison of the image attributes and the attribute values, different preset differential attribute thresholds may be configured. For example, in a case that the image attribute is lightness and an attribute value comparison is performed by subtraction of the attribute values, the preset differential attribute threshold may be 0. For another example, in a case that the image attribute is contrast and the attribute value comparison is performed by subtraction of the attribute values, the preset differential attribute threshold may be 0. For still another example, in a case that the image attribute is hue and the attribute value comparison is performed by subtraction of the attribute values, the preset differential attribute threshold may be a minimum value greater than 0, and the minimum value may be configured according to an actual application scenario. For example, the preset differential attribute threshold may be 1. A lower limit of the preset attribute value range may be configured according to an actual application scenario. For example, the lower limit of the preset attribute value range may be 0.

In some embodiments, for the differential attribute value of each pixel position in the different attribute characterizations, the terminal compares the differential attribute value with the preset differential attribute threshold, if the differential attribute value is smaller than the preset differential attribute threshold, maps the differential attribute value to the lower limit of the preset attribute value range to obtain an attribute difference of the pixel position corresponding to the differential attribute value, and if the differential attribute value is not smaller than the preset differential attribute threshold, maps the differential attribute value to the preset attribute value range in a positively correlated mapping manner, to obtain an attribute difference of the pixel position corresponding to the differential attribute value.

In some embodiments, during mapping the differential attribute value to the preset attribute value range in a positively correlated mapping manner, if the differential attribute value is a maximum differential attribute value, the terminal maps the differential attribute value to an upper limit of the preset attribute value range; and if the differential attribute value is not the maximum differential attribute value, the terminal uses a ratio of the differential attribute value to the maximum differential attribute value as the attribute difference of the pixel position corresponding to the differential attribute value. The maximum differential attribute value refers to a maximum value among the differential attribute values of the pixel positions. The upper limit of the preset attribute value range may be configured according to an actual application scenario. For example, the upper limit of the preset attribute value range may be 1.

In some embodiments, during mapping the differential attribute value to the preset attribute value range in a positively correlated mapping manner, the terminal may use a normalization function such as a Sigmoid function and a Softmax function to perform positively correlated mapping. A Sigmoid function is an S-type function in biology, and is also called an S-type growth curve. In the information science, due to its natures of monotonically increasing and having an inverse function that increases monotonically, the Sigmoid function is often used as an activation function of a neural network, to map a variable to 0 to 1. The Softmax function is also referred to as a normalized exponential function, and is a generalization of the binary classification function Sigmoid in multi-classification, to represent a result of the multi-classification in the form of probability.

In some embodiments, mapping of the differential attribute value of each pixel position in the different attribute characterizations can be implemented, and the impact of different orders of magnitude on the generation of local fusion weights can be eliminated, to obtain the attribute difference of each pixel position in the different attribute characterizations.

In some embodiments, the at least part of pixel positions includes a part of pixel positions that form a labeled region, an attribute value of each pixel position in the labeled region in the attribute characterization of the enhanced image meets a labeled region recognition condition. A pixel value of each pixel position in a non-labeled region of the fused image is equal to a pixel value of the same pixel position in the enhanced image.

The labeled region refers to a specific region with a distinct image attribute that is labeled based on an image attribute of interest. For example, in a case that the image attribute is lightness, the labeled region may be, in some embodiments, a relatively brighter region that is labeled based on the lightness. For another example, in a case that the image attribute is hue, the labeled region may be, in some embodiments, a region that includes a specific color and is labeled based on the specific color. For example, the specific color may be yellow, and the labeled region may be, in some embodiments, a region including yellow. The labeled region recognition condition refers to a condition for recognizing the labeled region, and may be configured according to an actual application scenario. For different image attributes, a corresponding labeled region recognition condition may be different.

In some embodiments, the at least part of pixel positions includes the part of pixel positions that form the labeled region. The terminal performs labeled region recognition on the attribute characterization of the enhanced image based on the labeled region recognition condition, to obtain a labeled region in the attribute characterization of the enhanced image that meets the labeled region recognition condition. In some embodiments, both the labeled region recognition condition and the attribute characterization correspond to the image attribute. The terminal performs labeled region recognition on the attribute characterization of the enhanced image based on a labeled region recognition condition for the same image attribute, to obtain a labeled region in the attribute characterization of the enhanced image that meets the labeled region recognition condition. In some embodiments, a labeled region is usually a region with poor enhancement effect, and correspondingly, a non-labeled region is a region with good enhancement effect. Therefore, for the non-labeled region with good enhancement effect, during performing image fusion on the source image and the enhanced image, the terminal may determine a pixel value of each pixel position in the non-labeled region of the enhanced image as a pixel value of the same pixel position in the fused image directly. In other words, the pixel value of each pixel position in the non-labeled region of the fused image is equal to the pixel value of the same pixel position in the enhanced image.

In some embodiments, a labeled region in the attribute characterization of the enhanced image can be determined based on the labeled region recognition condition, so that the pixel value of each pixel position in the non-labeled region of the fused image can be determined based on the determined labeled region.

In some embodiments, the labeled region recognition condition includes: pixel positions in the labeled region in the attribute characterization of the enhanced image constitutes a connected domain, and an attribute value of each pixel position in the connected domain in the attribute characterization of the enhanced image falls within a preset labeling attribute value range.

The preset labeling attribute value range may be configured according to an actual application scenario, and different image attributes correspond to different preset labeling attribute value ranges. For example, in a case that the image attribute is lightness, the corresponding preset labeling attribute value range may be greater than 0, which indicates that a to-be-identified labeled region is a relatively brighter region. For another example, in a case that the image attribute is lightness, the corresponding preset labeling attribute value range may be smaller than 0, which indicates that a to-be-identified labeled region is a relatively darker region. For still another example, in a case that the image attribute is hue, the corresponding preset labeling attribute value range may be an attribute value range corresponding to a specific color. For example, the corresponding preset labeling attribute value range may be an attribute value range corresponding to yellow.

In some embodiments, the terminal performs labeled region recognition on the attribute characterization of the enhanced image based on the labeled region recognition condition, to obtain a labeled region in the attribute characterization of the enhanced image that meets the labeled region recognition condition. The labeled region recognition condition includes: pixel positions in the labeled region in the attribute characterization of the enhanced image constitutes a connected domain, and an attribute value of each pixel position in the connected domain in the attribute characterization of the enhanced image falls within a preset labeling attribute value range.

In some embodiments, during performing the labeled region recognition, the terminal performs edge-preserving filtering on the attribute characterization of the enhanced image, to remove texture details while remaining the large contour, and compares the attribute value of each pixel position in the filtered attribute characterization with the preset labeling attribute value range, to obtain a filtered labeled region in the attribute characterization that meets the labeled region recognition condition. Because the terminal performs edge-preserving filtering to remove texture details while remaining the large outline during identifying the labeled region, the pixel positions of the labeled region in the attribute characterization of the enhanced image can form a connected domain.

In some embodiments, by defining the labeled region recognition condition, the labeled region recognition on the attribute characterization of the enhanced image can be implemented by using the labeled region recognition condition, to obtain the labeled region in the attribute characterization of the enhanced image.

In some embodiments, local fusion weights of pixel positions in the non-labeled region of the source image are 0, an enhanced fusion weight of each pixel position in the non-labeled region of the enhanced image is determined based on a local fusion weight of the same pixel positions in the source image, the generating a fused image of the source image and the enhanced image includes:

for each pixel position in the source image and the same pixel position in the enhanced image, performing weighted fusion on a pixel value of the pixel position in the source image and a pixel value of the same pixel position in the enhanced image based on a local fusion weight and an enhanced fusion weight of the pixel position, to obtain a fused image.

In some embodiments, a local fusion weight of each of a plurality of pixel positions in the non-labeled region of the source image is 0. The terminal determines a local fusion weight of each of the plurality of pixel positions in the non-labeled region of the enhanced image based on the local fusion weight of each of the plurality of pixel positions in the non-labeled region of the source image. The local fusion weight of each pixel position in the non-labeled region of the source image is negatively correlated with the enhanced fusion weight of the same pixel position in the non-labeled region of the enhanced image. For each pixel position in the source image and the same pixel position in the enhanced image, the terminal performs weighted fusion on the pixel value of the pixel position in the source image and the pixel value of the same pixel position in the enhanced image based on a local fusion weight and an enhanced fusion weight of the pixel position, to obtain a fused image.

In some embodiments, a sum of a local fusion weight and an enhanced fusion weight of each pixel position in a non-labeled region is pre-configured. The local fusion weight of a pixel position in the source image is subtracted from the pre-configured sum, to obtain an enhanced fusion weight of the same pixel position in the enhanced image. For example, the pre-configured sum may be 1. The local fusion weight (which is may be 0) of the pixel position in the source image can be subtracted from 1, to obtain the enhanced fusion weight (which is may be 1) of the same pixel position in the enhanced image.

In some embodiments, a pixel value of the same pixel position in the fused image is a sum of a product of a local fusion weight and a pixel value of the same pixel position in the source image and a product of an enhanced fusion weight and a pixel value of the same pixel position in the enhanced image. That is, the pixel value of the same pixel position in the fused image equals to the local fusion weight multiplied by the pixel value of the same pixel position in the source image plus the enhanced fusion weight multiplied by a pixel value of the same pixel position in the enhanced image. In some embodiments, due to the local fusion weight of each pixel position in the non-labeled region of the source image is 0, the pixel value of the same pixel position in the fused image equals to a product of the enhanced fusion weight and the pixel value of the same pixel position in the enhanced image.

In some embodiments, the local fusion weights of the pixel positions in the non-labeled region of the source image are 0. Based on this, the enhanced fusion weights of the pixel positions in the non-labeled region of the enhanced image can be determined. Image fusion is performed using the local fusion weights and the enhanced fusion weights of the pixel positions in the non-labeled region, so that the pixel value of each pixel position in the fused image is closer to the pixel value of the same pixel position in the enhanced image, thereby achieving a good enhancement effect.

In some embodiments, the generating a fused image of the source image and the enhanced image includes:

for each pixel position in a labeled region, performing weighted fusion on a pixel value of the pixel position in the labeled region of the source image and a pixel value of the pixel position in the labeled region of the enhanced image based on a corresponding local fusion weight and enhanced fusion weight of the pixel position in the labeled region, to form a pixel value of the pixel position in the labeled region of the fused image; and using a pixel value of each pixel position in the non-labeled region of the enhanced image as a pixel value of the same pixel position in the non-labeled region of the fused image.

In some embodiments, during generating the fused image of the source image and the enhanced image, for each pixel position in the labeled region, the terminal performs weighted fusion on a pixel value of the pixel position in the labeled region of the source image and a pixel value of the pixel position in the labeled region of the enhanced image based on a corresponding local fusion weight and enhanced fusion weight of the pixel position in the labeled region, to form a pixel value of the pixel position in the labeled region of the fused image. For a non-labeled region, the terminal uses a pixel value of each pixel position in the non-labeled region of the enhanced image as a pixel value of the same pixel position in the non-labeled region of the fused image.

In some embodiments, for each pixel position in the labeled region, a pixel value of the pixel position in the labeled region of the fused image is a sum of a product of a local fusion weight corresponding to the pixel position in the labeled region and a pixel value of the pixel position in the labeled region of the source image and a product of an enhanced fusion weight corresponding to the pixel position in the labeled region and a pixel value of the pixel position in the labeled region of the enhanced image. In other words, a pixel value of the pixel position in the labeled region of the fused image equals to a local fusion weight corresponding to the pixel position in the labeled region multiplied by a pixel value of the pixel position in the labeled region of the source image plus an enhanced fusion weight corresponding to the pixel position in the labeled region multiplied by a pixel value of the pixel position in the labeled region of the enhanced image.

In some embodiments, by performing image fusion on each pixel position in a labeled region, the labeled region in the enhanced image can be enhanced by using the source image, so that a pixel value of a corresponding pixel position in the fused image is closer to a pixel value of the same pixel position in the source image, thereby improving enhancement effect. A pixel value of each pixel position in the non-labeled region of the enhanced image is used as a pixel value of the same pixel position in the non-labeled region of the fused image, so that the pixel value of the same pixel position in the non-labeled region of the fused image is closer to the pixel value of the corresponding pixel position in the enhanced image, thereby achieving a good enhancement effect.

In some embodiments, the generating local fusion weights of the at least part of pixel positions in the source image based on the attribute differences and the attribute characterization of the enhanced image includes:

performing edge-preserving filtering on the attribute characterization of the enhanced image, to obtain a smoothed attribute characterization of the enhanced image; and generating local fusion weights of the at least part of pixel positions in the source image based on the attribute differences and attribute values of the at least part of pixel positions in the smoothed attribute characterization.

Edge-preserving filtering refers to filtering to remove texture details in an attribute characterization while remaining an edge outline.

In some embodiments, the terminal performs edge-preserving filtering on the attribute characterization of the enhanced image, to obtain a smoothed attribute characterization of the enhanced image, and generates local fusion weights of the at least part of pixel positions in the source image based on attribute differences of the at least part of pixel positions and attribute values of the at least part of pixel positions in the smoothed attribute characterization. In a case that the at least part of pixel positions is a plurality of pixel positions, the local fusion weights of the at least part of pixel positions may be, in some embodiments, local fusion weights of the plurality of pixel positions. The edge-preserving filtering may be performed by guided filtering, bilateral filtering, morphological opening and closure, or the like. The manner of the edge-preserving filtering is not limited herein, as long as the edge-preserving filtering can be implemented.

In some embodiments, the terminal performs the edge-preserving filtering on the attribute characterization of the enhanced image by guided filtering. The guided filtering explicitly uses a guidance image to calculate an output image. The guidance image may be the output image itself or another image. The guided filtering can achieve a better effect than the bilateral filtering at an edge. In addition, the guided filtering has a speed advantage in O(N) linear time. In some embodiments, the output image itself is used as the guidance image. In other words, the attribute characterization of the enhanced image is used as the guidance image in the guided filtering.

In some embodiments, the terminal performs the edge-preserving filtering on the attribute characterization of the enhanced image by bilateral filtering. Bilateral filtering is a nonlinear filtering method, and is a compromising processing that combines spatial proximity and pixel value similarity of images, while considering spatial domain information and grayscale similarity to achieve edge-preserving denoising. The bilateral filtering is simple, non-iterative and local.

In some embodiments, the terminal performs the edge-preserving filtering on the attribute characterization of the enhanced image by morphological opening and closure. Definition of a morphological opening operation is to erode an image and then expand the image. The operation erodes the image first to remove noise and a relatively smaller connected domain in the image, and then compensate for area reduction caused by erosion in a relatively larger connected domain by an expansion operation. Opposite to the opening operation, a morphological closure operation expands an image first and then erodes same. The operation expands the image first to fill small holes in connected domains, expand boundaries of the connected domains, connect two adjacent connected domains, and then performs an erosion operation to reduce expansion of the boundaries of the connected domains and increase in area caused by the expansion operation.

In some embodiments, during performing the edge-preserving filtering on the attribute characterization of the enhanced image by morphological opening and closure, the terminal performs an opening operation on the attribute characterization of the enhanced image first, and then performs a closure operation on the attribute characterization of the enhanced image, to obtain a smoothed attribute characterization of the enhanced image.

In some embodiments, the edge-preserving filtering is performed on the attribute characterization of the enhanced image, remove texture details while remaining edges, to implement image smoothing of the attribute characterization and obtain a smoothed attribute characterization of the enhanced image, so that local fusion weights of at least part of pixel positions in the source image can be generated based on attribute differences and attribute values of at least part of pixel positions in the smoothed attribute characterization.

In some embodiments, the generating local fusion weights of the at least part of pixel positions in the source image based on the attribute differences and attribute values of the at least part of pixel positions in the smoothed attribute characterization includes:

for each of the at least part of pixel positions, performing fusion on an attribute difference of the pixel position and an attribute value of the pixel position in the smoothed attribute characterization, to generate a local fusion weight of the pixel position.

In some embodiments, for each of the at least part of pixel positions, the terminal performs fusion on the attribute difference of the pixel position and the attribute value of the pixel position in the smoothed attribute characterization, to generate the local fusion weight of the pixel position. In some embodiments, a specific fusion manner may be multiplying the attribute difference of the pixel position and the attribute value of the pixel position in the smoothed attribute characterization.

In an embodiment, during performing fusion, the terminal performs weight adjustment on the attribute difference of the pixel position and the attribute value of the pixel position in the smoothed attribute characterization first, to increase or reduce importance of the attribute difference and the attribute value, and then performs the fusion on the attribute difference and the attribute value, to generate a local fusion weight of the pixel position. The manner of weight adjustment is not specifically limited herein, as long as the weight adjustment can be implemented to increase or reduce importance of an attribute difference and an attribute value.

In some embodiments, a weight-adjusted attribute difference and a weight-adjusted attribute value are fused by multiplying the weight-adjusted attribute difference and the weight-adjusted attribute value. The product of the weight-adjusted attribute difference and the weight-adjusted attribute value is a local fusion weight of the pixel position.

In some embodiments, for each of the at least part of pixel positions, fusion is performed on the attribute difference of the pixel position and the attribute value of the pixel position in the smoothed attribute characterization. In this way, a more appropriate local fusion weight of the pixel position can be generated in comprehensive consideration of the attribute difference and the attribute value, so as to implement image fusion using the more appropriate local fusion weight, thereby improving enhancement effect.

In some embodiments, the performing fusion on the attribute difference of the pixel position and the attribute value of the pixel position in the smoothed attribute characterization, to generate the local fusion weight of the pixel position includes:

obtaining a variation stretch factor and an attribute stretch factor;

performing weight adjustment on the attribute difference of the pixel position based on the variation stretch factor, to obtain an attribute difference weight;

performing weight adjustment on the attribute value of the pixel position in the smoothed attribute characterization based on the attribute stretch factor, to obtain an attribute value weight; and performing fusion on the attribute difference weight and the attribute value weight, to generate a local fusion weight of the pixel position.

The variation stretch factor is used for stretching an attribute difference, to increase or reduce a factor of importance of an attribute difference (that is, a variation). The attribute stretch factor is used for stretching an attribute value, to increase or reduce a factor of importance of an attribute value. For example, the attribute stretch factor may be, in some embodiments, a lightness stretch factor. For another example, the attribute stretch factor may be, in some embodiments, a contrast stretch factor.

In some embodiments, the terminal obtains a variation stretch factor and an attribute stretch factor, performs weight adjustment on the attribute difference of the pixel position based on the variation stretch factor to obtain an attribute difference weight, performs weight adjustment on the attribute value of the pixel position in the smoothed attribute characterization based on the attribute stretch factor to obtain an attribute value weight, and performs fusion on the attribute difference weight and the attribute value weight to generate a local fusion weight of the pixel position. In some embodiments, both the variation stretch factor and the attribute stretch factor correspond to the image attribute. Variation stretch factors and attribute stretch factors corresponding to different image attributes may be different. The terminal may obtain the variation stretch factor and the attribute stretch factor based on an image attribute of interest. The image attribute of interest refers to an attribute difference and an image attribute corresponding to the smoothed attribute characterization.

In some embodiments, an attribute difference weight and an attribute value weight are fused by multiplying the attribute difference weight and the attribute value weight. The product of the attribute difference weight and the attribute value weight is a local fusion weight of the pixel position. In some embodiments, an attribute difference weight and an attribute value weight are fused by adding the attribute difference weight and the attribute value weight. The sum of the attribute difference weight and the attribute value weight is a local fusion weight of the pixel position. The variation stretch factor and the attribute stretch factor may be configured according to an actual application scenario, and is not specifically limited herein. For example, the variation stretch factor may be any value from 0 to 1, and the attribute stretch factor may be any value from 0 to 1.

In some embodiments, the terminal may use a power function, an exponential function, a logarithmic function, or the like to perform weight adjustment on the attribute difference and the attribute value. The manner of weight adjustment is not specifically limited herein, as long as the weight adjustment can be implemented. In some embodiments, the terminal may use a power function to perform weight adjustment on the attribute difference and the attribute value. To be specific, the attribute difference is used as the base and the variation stretch factor is used as the power to perform weight adjustment on the attribute difference and obtain the attribute difference weight; and the attribute value is used as the base and the attribute stretch factor is used as the power to perform weight adjustment on the attribute value and obtain the attribute value weight. For example, the attribute difference weight may be represented as $diff^{factor_{diff}}$, diff is the attribute difference, and $factor_{diff}$ is the variation stretch factor. The attribute value weight may be represented as $A^{factor_A}$. A is the attribute value, and $factor_A$ is the attribute stretch factor.

In some embodiments, as shown in FIG. 7, the terminal may use an attribute difference diff of the first pixel position as the base and a variation stretch factor $factor_{diff}$ as the power to perform weight adjustment on the attribute difference and obtain an attribute difference weight $diff^{factor_{diff}}$ of the first pixel position. The terminal may use an attribute value A of the first pixel position as the base and an attribute stretch factor factory as the power to perform weight adjustment on the attribute value and obtain an attribute value weight $A^{factor_A}$ of the first pixel position. Then the terminal multiplies the attribute difference weight and the attribute value weight, to obtain a local fusion weight $diff^{factor_{diff}} * A^{factor_A}$ of the first pixel position.

In some embodiments, weight adjustment is performed on an attribute difference of the pixel position based on a variation stretch factor, to adjust importance of the attribute difference and obtain an attribute difference weight, and weight adjustment is performed on an attribute value of the pixel position in a smoothed attribute characterization based on an attribute stretch factor, to adjust importance of the attribute value and obtain an attribute value weight, so that fusion can be performed on the attribute difference weight and the attribute value weight in comprehensive consideration of the attribute difference weight and the attribute value weight, to generate a local fusion weight of the pixel position.

In some embodiments, the attribute differences include image attribute differences in at least two image attributes of the at least part of pixel positions, the attribute characterization of the enhanced image comprises image attribute characterizations of the at least two image attributes of the enhanced image.

The generating local fusion weights of the at least part of pixel positions in the source image based on the attribute differences and the attribute characterization of the enhanced image includes:

for each of the at least two image attributes, generating attribute fusion weights of the image attribute of the at least part of pixel positions based on image attribute differences in the image attribute of the at least part of pixel positions and the image attribute characterization of the image attribute of the enhanced image; and for each of at least part of pixel positions, performing fusion on attribute fusion weights of the at least two image attributes corresponding to the pixel position, to generate a local fusion weight of the pixel position.

For each of the at least two image attributes, the attribute difference in the image attribute is used for describing a degree of attribute difference in the image attribute between a pixel position in the source image and the same pixel position in the enhanced image. The image attribute characterization refers to information that can characterize the image attribute. For example, the image attribute characterization may be an image that can characterize the image attribute, that is, an image attribute characterization image. In some embodiments, the attribute difference includes image attribute differences in at least two image attributes of at least part of pixel positions. The attribute characterization of the enhanced image includes image attribute characterizations of at least two image attributes. For each of the at least two image attributes in the enhanced image, the terminal generates attribute fusion weights of the image attribute of the at least part of pixel positions based on image attribute differences in the image attribute of the at least part of pixel positions and the image attribute characterization of the image attribute in the enhanced image.

In some embodiments, the terminal performs edge-preserving filtering on the image attribute characterization of the image attribute of the enhanced image, to obtain a smoothed image attribute characterization of the image attribute of the enhanced image. For each of the at least part of pixel positions, the fusion is performed on an image attribute difference between the image attribute of the pixel position and an attribute value of the pixel position in the smoothed image attribute characterization of the image attribute, to generate an attribute fusion weight of the image attribute of the pixel position. A specific fusion manner may be multiplying the image attribute difference of the image attribute of the pixel position and the attribute value of the pixel position in the smoothed image attribute characterization of the image attribute.

In some embodiments, the fusion manner may be that the terminal obtains a corresponding variation stretch factor and attribute stretch factor of the image attribute, performs weight adjustment on the image attribute difference of the image attribute of the pixel position based on the variation stretch factor, and adjusts the attribute value of the pixel position in the smoothed image attribute characterization of the image attribute based on the attribute stretch factor, and performs fusion on an adjusted attribute difference and an adjusted attribute value. In some embodiments, the adjusted attribute difference and the adjusted attribute value may be fused by multiplying the adjusted attribute difference and the adjusted attribute value.

In some embodiments, for each of at least part of pixel positions, the terminal performs fusion on attribute fusion weights of the at least two image attributes corresponding to the pixel position, to generate a local fusion weight of the pixel position. In some embodiments, the terminal performs fusion by superimposing attribute fusion weights of the at least two image attributes corresponding to the pixel position, to generate a local fusion weight of the pixel position.

In other words, the local fusion weight of the pixel position equals to a sum of the attribute fusion weights of the at least two image attributes.

In some embodiments, in consideration of an image attribute difference and an image attribute characterization of each of the at least two image attributes, optimization analysis of each image attribute is implemented, to generate the corresponding attribute fusion weights of the at least part of pixel positions with respect to the at least two image attributes. For each of the at least part of pixel positions, fusion is performed on the attribute fusion weights of the at least two image attributes of the pixel position, so that a more appropriate local fusion weight of the pixel position can be generated in comprehensive consideration of the attribute fusion weight with respect to each image attribute, so as to implement image fusion using the more appropriate local fusion weight, thereby improving enhancement effect.

FIG. 8 is a flowchart that describes an image processing method according to some embodiments. The method may be independently executed by a terminal or a server, or may be executed by the terminal and the server together. In some embodiments, the method is applied to a terminal. The method includes the following operations:

Operation 802: Obtain an attribute characterization of a source image and an attribute characterization of an enhanced image, the enhanced image being obtained by enhancing the source image.

Operation 804: Compare an attribute value of each pixel position in the attribute characterization of the source image with an attribute value of the same pixel position in the attribute characterization of the enhanced image, to obtain a differential attribute value of each pixel position in the different attribute characterizations.

Operation 806: For the differential attribute value of each pixel position in the different attribute characterizations, map the differential attribute value to a lower limit of a preset attribute value range in a case that the differential attribute value is smaller than a preset differential attribute threshold, to obtain an attribute difference of the pixel position corresponding to the differential attribute value, and map the differential attribute value to the preset attribute value range in a positively correlated mapping manner in a case that the differential attribute value is not smaller than the preset differential attribute threshold, to obtain an attribute difference of the pixel position corresponding to the differential attribute value.

Operation 808: Generate a differential attribute characterization based on the attribute difference of each pixel position in the different attribute characterizations, an attribute value of each pixel position in the differential attribute characterization being an attribute difference of the corresponding pixel position.

Operation 810: Perform edge-preserving filtering on the attribute characterization of the enhanced image, to obtain a smoothed attribute characterization of the enhanced image.

Operation 812: For each of at least part of pixel positions, obtain a variation stretch factor and an attribute stretch factor, perform weight adjustment on the attribute difference of the pixel position based on the variation stretch factor to obtain an attribute difference weight, perform weight adjustment on the attribute value of the pixel position in the smoothed attribute characterization based on the attribute stretch factor to obtain an attribute value weight, and perform fusion on the attribute difference weight and the attribute value weight to generate a local fusion weight of the pixel position.

Operation 814: Determine enhanced fusion weights of the at least part of pixel positions in the enhanced image, a determined enhanced fusion weight of at least one pixel position being negatively correlated with a local fusion weight of the same pixel position in the source image.

Operation 816: Generate a fused image of the source image and the enhanced image.

Figure 9:
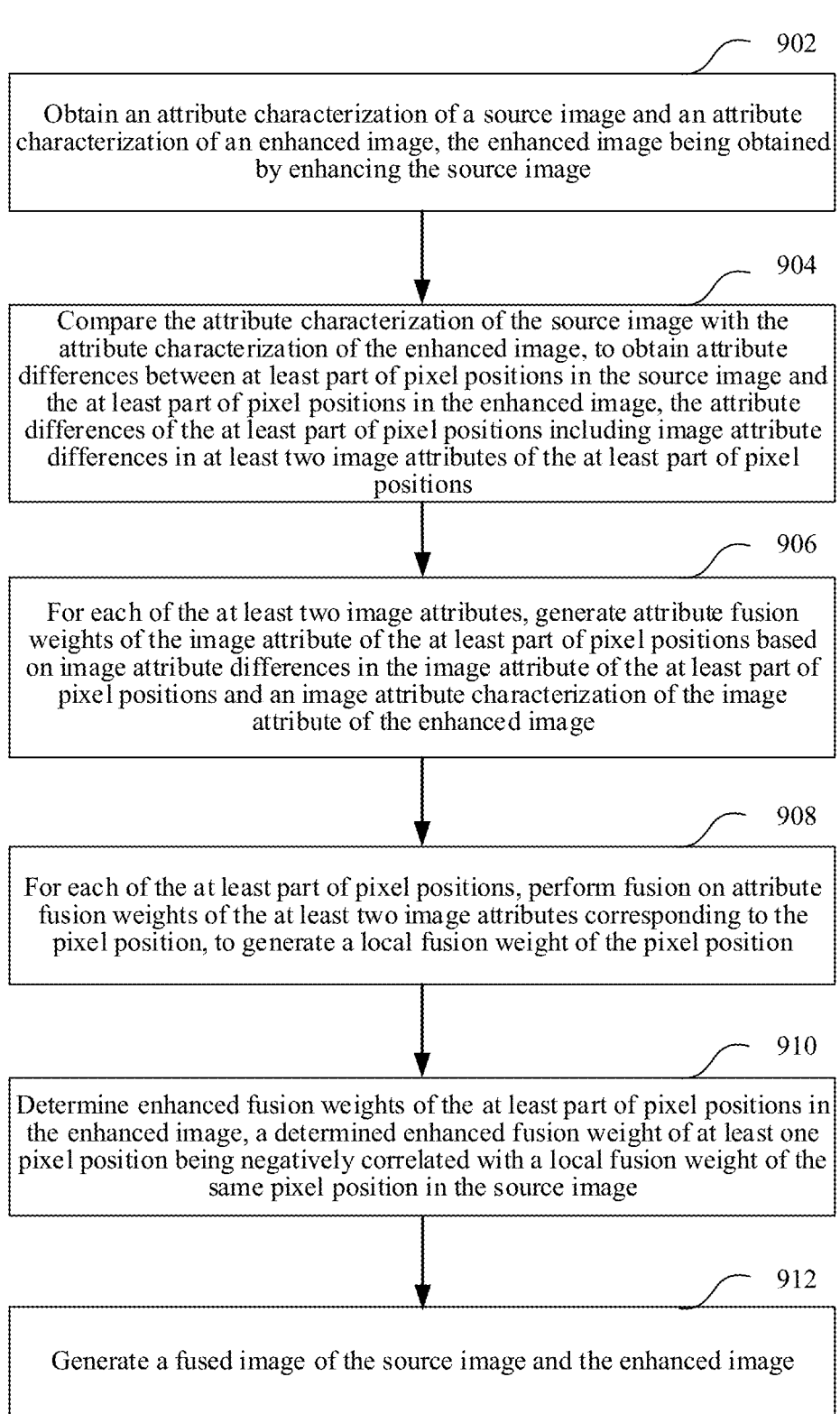
FIG. 9 is a flowchart of an image processing method according to still some embodiments.

In some embodiments, FIG. 9 is a flowchart that describes an image processing method according to some embodiments. The method may be independently executed by a terminal or a server, or may be executed by the terminal and the server together. In some embodiments, an example in which the method is applied to a terminal is used for description. The method includes the following operations:

Operation 902: Obtain an attribute characterization of a source image and an attribute characterization of an enhanced image, the enhanced image being obtained by enhancing the source image.

Operation 904: Compare the attribute characterization of the source image with the attribute characterization of the enhanced image, to obtain attribute differences between at least part of pixel positions in the source image and the at least part of pixel positions in the enhanced image, the attribute differences of the at least part of pixel positions including image attribute differences in at least two image attributes of the at least part of pixel positions.

Operation 906: For each of the at least two image attributes, generate attribute fusion weights of the image attribute of the at least part of pixel positions based on image attribute differences in the image attribute of the at least part of pixel positions and an image attribute characterization of the image attribute of the enhanced image.

Operation 908: For each of the at least part of pixel positions, perform fusion on attribute fusion weights of the at least two image attributes corresponding to the pixel position, to generate a local fusion weight of the pixel position.

Operation 910: Determine enhanced fusion weights of the at least part of pixel positions in the enhanced image, a determined enhanced fusion weight of at least one pixel position being negatively correlated with a local fusion weight of the same pixel position in the source image.

Operation 912: Generate a fused image of the source image and the enhanced image.

In a conventional post-enhancement technology solution, which employ a global fusion solution, the use of the same fusion factors for all regions and pixels of images would cause a final enhanced output image to be either proportionally close to a source image as a whole or proportionally close to an enhanced image as a whole. Since it is difficult for conventional enhancement algorithms to ensure that the enhancement effect in all regions of all scenes are equally satisfactory, the use of the global fusion solution for fusion in equal proportions would result in preservation of poor enhancement effect in some regions to the same degree as satisfactory enhancement effect in some regions, making it impossible to achieve adaptive fusion of post-enhancement in different regions and pixels. In addition, the setting of a global fusion factor relatively depends on experience of algorithm developers, leading to limited adaptability.

Based on this, some embodiments provide an image processing method, to resolve a problem of all pixels in the global fusion solution using a same factor by using a pixel-by-pixel local fusion factor, so as to implement more flexible fusion. Adaptive fusion factor calculation is performed based on an image attribute and an enhancement varying trend, to resolve problems of experience-depending design and insufficient adaptability in a global enhancement method, thereby implementing more intelligent fusion.

Figure 10:
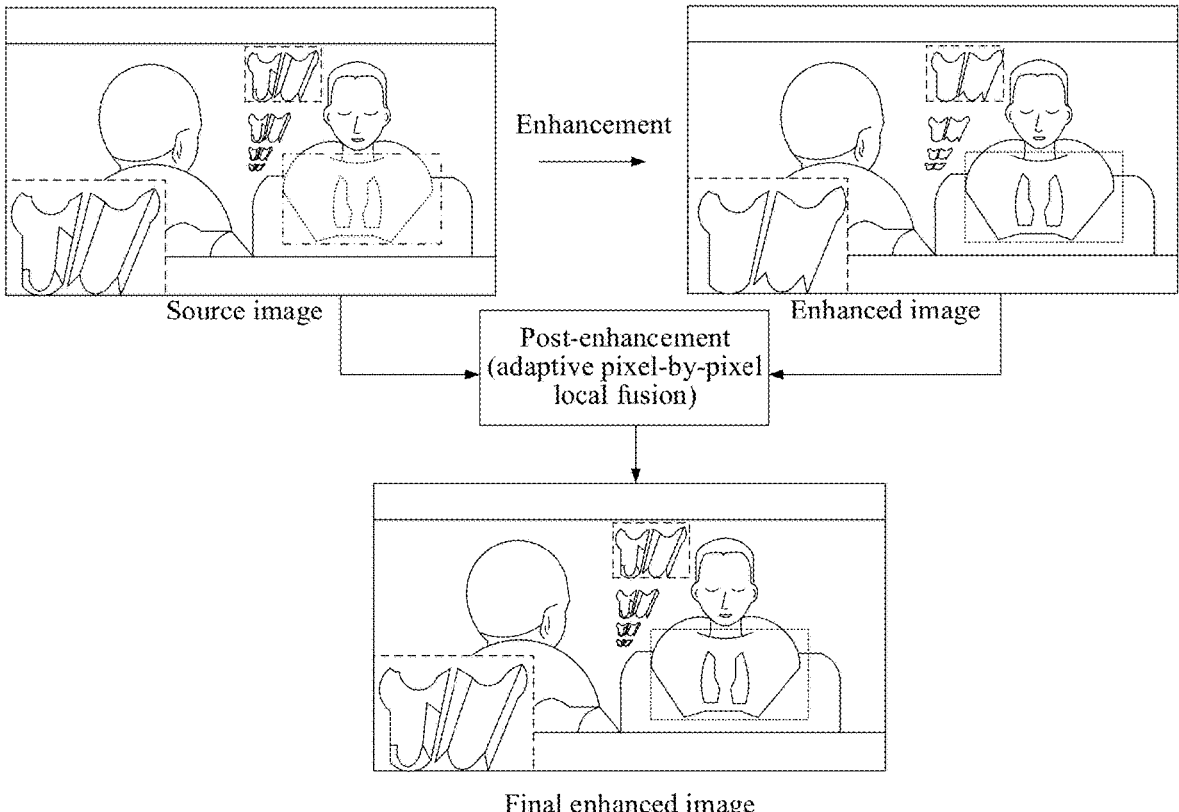
FIG. 10 is a diagram of an application scenario of image processing according to some embodiments.

The image processing method provided in some embodiments, as part of the whole enhancement algorithm, is applied in post-processing operations by an image enhancement module. As shown in FIG. 10, after an enhanced image is obtained by enhancing a source image, the image processing method may be applied to perform post-enhancement (adaptive pixel-by-pixel local fusion) on the source image and the enhanced image, to output a final enhanced image, that is, a fused image. Furthermore, the image processing method provided in some embodiments may be used for any video data with image quality enhancement needs, which includes, but is not limited to, any long video, short video, and the like.

For example, when the image processing method provided in some embodiments is used for video data, the image processing method may be applied to process a single video frame. In some embodiments, a single video frame may be used as the source image. After the single video frame is enhanced to obtain an enhanced image corresponding to the single video frame, the enhanced image is processed using the image processing method provided in some embodiments to implement image enhancement of the single video frame. In some embodiments, frames adjacent in the time domain in the video data can alternatively be used as a source image and an enhanced image respectively and processed using the image processing method provided in some embodiments, to implement image enhancement of a single video frame.

The image processing method provided in some embodiments may focus on different image attribute dimensions such as lightness, hue, and contrast, and analyze a varying trend of the enhanced image relative to the source image, to cause pixel values of a region of the enhanced image that has an image attribute dimension of interest poorer than the source image to be closer to those of the source image (that is, the local fusion weight of a pixel position in the source image is closer to 1)

Figure 11:
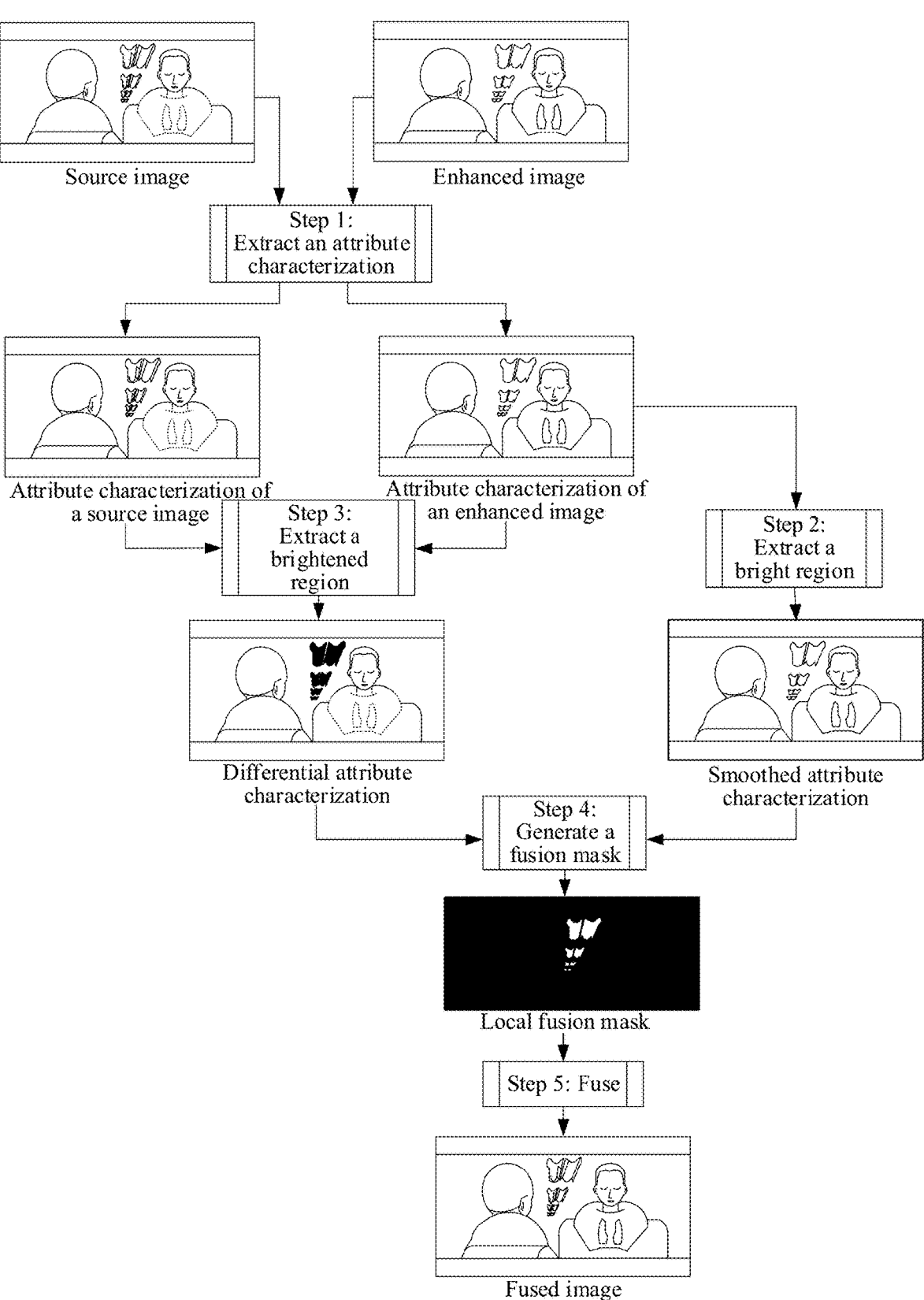
FIG. 11 is a flowchart of an image processing method according to yet some embodiments.

The following describes the image processing method provided in some embodiments by using an example in which the lightness is focused on. It is assumed that after the conventional enhancement operations, details (usually details of dark portions) of a relatively brighter region of the enhanced image are lost compared with the source image. The image processing method provided in some embodiments may be used to reinforce the conventional enhancement, to improve the quality of a final enhanced image. The specific flowchart of the process may be as shown in FIG. 11. The image processing method includes the following operations:

Operation 1: Extract an attribute characterization, that is, obtain an attribute characterization of a source image and an attribute characterization of an enhanced image with respect to a lightness attribute.

The attribute characterization with respect to the lightness attribute may be a grayscale image, a V-channel image in a HSV color model, or an L-channel image in a LAB color model.

In some embodiments, the terminal obtains the attribute characterization of the source image and the attribute characterization of the enhanced image with respect to the lightness attribute, respectively.

Operation 2: Extract a bright region, that is, label a relatively brighter region in the enhanced image.

In some embodiments, the terminal performs edge-preserving filtering on the attribute characterization of the enhanced image to remove texture details while remaining a large outline, so that the relatively brighter region of the enhanced image is extracted, to obtain a smoothed attribute characterization of the enhanced image.

The edge-preserving filtering may be performed by guided filtering, bilateral filtering, morphological opening and closure, or the like. The manner of the edge-preserving filtering is not limited herein, as long as the edge-preserving filtering can be implemented.

In some embodiments, the edge-preserving filtering may be performed on the attribute characterization of the enhanced image by guided filtering. The filtering may be represented as an equation lightness=guide_filter $(gray_{enhanced})$. lightness represents a filtered attribute characterization, guide_filter represents the guided filtering, and $gray_{enhanced}$ represents the attribute characterization of the enhanced image.

Operation 3: Extract a brightened region, that is, label a region in the enhanced image that becomes brighter compared with the same region in the source image.

In some embodiments, the terminal compares an attribute value of each pixel position in the attribute characterization of the source image with an attribute value of the same pixel position in the attribute characterization of the enhanced image, to obtain a differential attribute value of each pixel position in the different attribute characterizations, subtracts a preset lightness noise threshold from the differential attribute value of each pixel position in the different attribute characterizations, to remove useless lightness fluctuation noise, map a differential attribute value of each pixel position in the different attribute characterizations subtracted by a noise threshold a preset attribute value range, to obtain an attribute difference of each pixel position in the different attribute characterizations, and generates a differential attribute characterization based on an attribute difference of each pixel position in the different attribute characterizations. An attribute value of each pixel position in the differential attribute characterization is an attribute difference of the corresponding pixel position. The preset lightness noise threshold may be configured according to an actual application scenario. For example, the preset lightness noise threshold may be 0.1 cd/m$^2$ (candela per square meter).

In some embodiments, for the differential attribute value of each pixel position in the different attribute characterizations, the terminal maps the differential attribute value to a lower limit of the preset attribute value range in a case that the differential attribute value is smaller than a preset differential attribute threshold, to obtain an attribute difference of the pixel position corresponding to the differential attribute value. The terminal maps the differential attribute value to the preset attribute value range in a positively correlated mapping manner in a case that the differential attribute value is not smaller than the preset differential attribute threshold, to obtain an attribute difference of the pixel position corresponding to the differential attribute value.

The preset differential attribute threshold and the lower limit of the preset attribute value range may be configured according to an actual application scenario. In some embodiments, the preset differential attribute threshold may be 0, and the lower limit of the preset attribute value range may also be 0. The terminal maps the differential attribute value to 0 in a case that the differential attribute value is smaller than 0. In this way, the terminal uniformly maps differential attribute values smaller than the preset differential attribute threshold to the lower limit of the preset attribute value range, so that a differential attribute characterization obtained only emphasizes a region of the enhanced image that is brighter than the same region of the source image, that is, a region in which dark details are lost.

In some embodiments, during mapping the differential attribute value to the preset attribute value range in a positively correlated mapping manner, if the differential attribute value is a maximum differential attribute value, the terminal maps the differential attribute value to an upper limit of the preset attribute value range; and if the differential attribute value is not the maximum differential attribute value, the terminal uses a ratio of the differential attribute value to the maximum differential attribute value as the attribute difference of the pixel position corresponding to the differential attribute value. An upper limit of the preset attribute value range may be configured according to an actual application scenario.

In some embodiments, the upper limit of the preset attribute value range may be 1, the lower limit of the preset attribute value range may be 0. The differential attribute value of each pixel position is mapped to the preset attribute value range, so that each differential attribute value is mapped to [0, 1], that is, normalization processing is implemented.

In some embodiments, a data processing process in operation 3 can be implemented by the following two equations. The first one is an equation diff=ReLU $(gray_{enhanced} -gray_{src}-\varepsilon)$. diff represents a differential attribute characterization before normalization, $gray_{enhanced}$ represents the enhanced image, $gray_{src}$ represents the source image, $\varepsilon$ represents the preset lightness noise threshold, and ReLU represents a linear rectification function, which is also referred to as a rectified linear unit, is an activation function commonly used in artificial neural networks, and generally refers to a nonlinear function represented by a ramp function and its variants. The second one is an equation $$diff_{(x,y)} = \frac{diff_{(x,y)}}{\max_{(x,y)}(diff)}.$$

Normalization processing of a differential attribute value may be implemented using the equation. $diff_{(x,y)}$ on the right side of the equation represents a differential attribute value of a pixel position in a differential attribute characterization before normalization, $diff_{(x,y)}$ on the left side of the equation represents an attribute difference of a pixel position, and $$\max_{(x,y)} (diff)$$

represents a maximum differential attribute value of a differential attribute characterization before normalization.

Operation 4: Generate a fusion mask, that is, combine operations 2 and 3 to extract pixel points in a bright region that loses details of dark portions, to generate a local fusion mask.

In some embodiments, the terminal generates a local fusion weight of each of the at least part of pixel positions in the source image, that is, the local fusion mask, based on the attribute differences of the at least part of pixel positions obtained in operation 3 and the attribute values of the at least part of pixel positions in the smoothed attribute characterization of the enhanced image obtained in operation 2.

In some embodiments, for each of at least part of pixel positions, the terminal obtains a variation stretch factor and a lightness stretch factor corresponding to a lightness attribute, performs weight adjustment on the attribute difference of the pixel position based on the variation stretch factor to obtain an attribute difference weight, performs weight adjustment on the attribute value of the pixel position in the smoothed attribute characterization based on the lightness stretch factor to obtain an attribute value weight, and performs fusion on the attribute difference weight and the attribute value weight to generate a local fusion weight of the pixel position. The variation stretch factor and the lightness stretch factor may be configured according to an actual application scenario, and are not specifically limited herein. A larger variation stretch factor indicates a larger amplitude of increase in importance of an attribute difference, and a larger lightness stretch factor indicates a larger amplitude of increase in importance of the attribute value.

In some embodiments, the terminal may use a power function, an exponential function, a logarithmic function, or the like to perform weight adjustment on the attribute difference and the attribute value. The manner of weight adjustment is not specifically limited herein, as long as the weight adjustment can be implemented. In some embodiments, the terminal may use a power function to perform weight adjustment on the attribute difference and the attribute value. To be specific, the attribute difference is used as the base and the variation stretch factor is used as the power to perform weight adjustment on the attribute difference and obtain the attribute difference weight; and the attribute value is used as the base and the lightness stretch factor is used as the power to perform weight adjustment on the attribute value and obtain the attribute value weight. For example, the attribute difference weight may be represented as $\text{diff}^{factor}_{diff}$. diff is the attribute difference, and $\text{factor}_{diff}$ is the variation stretch factor. The attribute value weight may be represented as $\text{lightness}^{factor}_{lightness}$. lightness is the attribute value, and $\text{factor}_{lightness}$ is the lightness stretch factor.

In some embodiments, an attribute difference weight and an attribute value weight are fused by multiplying the attribute difference weight and the attribute value weight. The product of the attribute difference weight and the attribute value weight is a local fusion weight of a pixel position. For example, the local fusion weight may be: $\text{alpha\_mask}=\text{lightness}^{factor}_{lightness}*\text{diff}^{factor}_{diff}$. $\text{lightness}^{factor}_{lightness}$ is an attribute value weight, and $\text{diff}^{factor}_{diff}$ is an attribute difference weight.

Operation 5: Fuse, that is, perform weighted fusion on the source image and the enhanced image by using the local fusion mask generated by operation 4, to obtain a final enhanced image, that is, a fused image.

In some embodiments, the terminal generates the fused image of the source image and the enhanced image. For each of the at least part of pixel positions, a pixel value of the pixel position of the fused image is obtained by performing weighted fusion on a pixel value of the pixel position in the source image and a pixel value of the pixel position in the enhanced image based on the local fusion weight and the enhanced fusion weight of the pixel position. In other words, a unique fusion value is used for each of the at least part of pixel positions. In this way, image fusion can be implemented more flexibly. An enhanced fusion weight of each of the at least part of pixel positions in the enhanced image is negatively correlated with a local fusion weight of the same pixel position in the source image.

In some embodiments, a sum of a local fusion weight and an enhanced fusion weight of each pixel position is pre-configured. By subtracting a local fusion weight of a pixel position in the source image from the pre-configured sum, an enhanced fusion weight of the same pixel position in the enhanced image can be obtained. For example, the pre-configured sum may be 1. The local fusion weight of the pixel position in the source image can be subtracted from 1, to obtain the enhanced fusion weight of the same pixel position in the enhanced image.

In some embodiments, a fusion equation used for generating a fused image may be: dst=alpha_mask*src+(1−alpha_mask)*enhanced. src represents the source image, enhanced represents the enhanced image, alpha_mask represents a local fusion weight, and 1−alpha_mask represents an enhanced fusion weight. In the equation, a pixel point is used as an execution unit. In other words, for each of at least part of pixel positions, a pixel value of the pixel position in the fused image dst is obtained by performing weighted fusion on a pixel value of the pixel position in the source image src and a pixel value of the pixel position in the enhanced image enhanced based on a local fusion weight alpha_mask and an enhanced fusion weight 1−alpha_mask of the pixel position.

Figure 12:
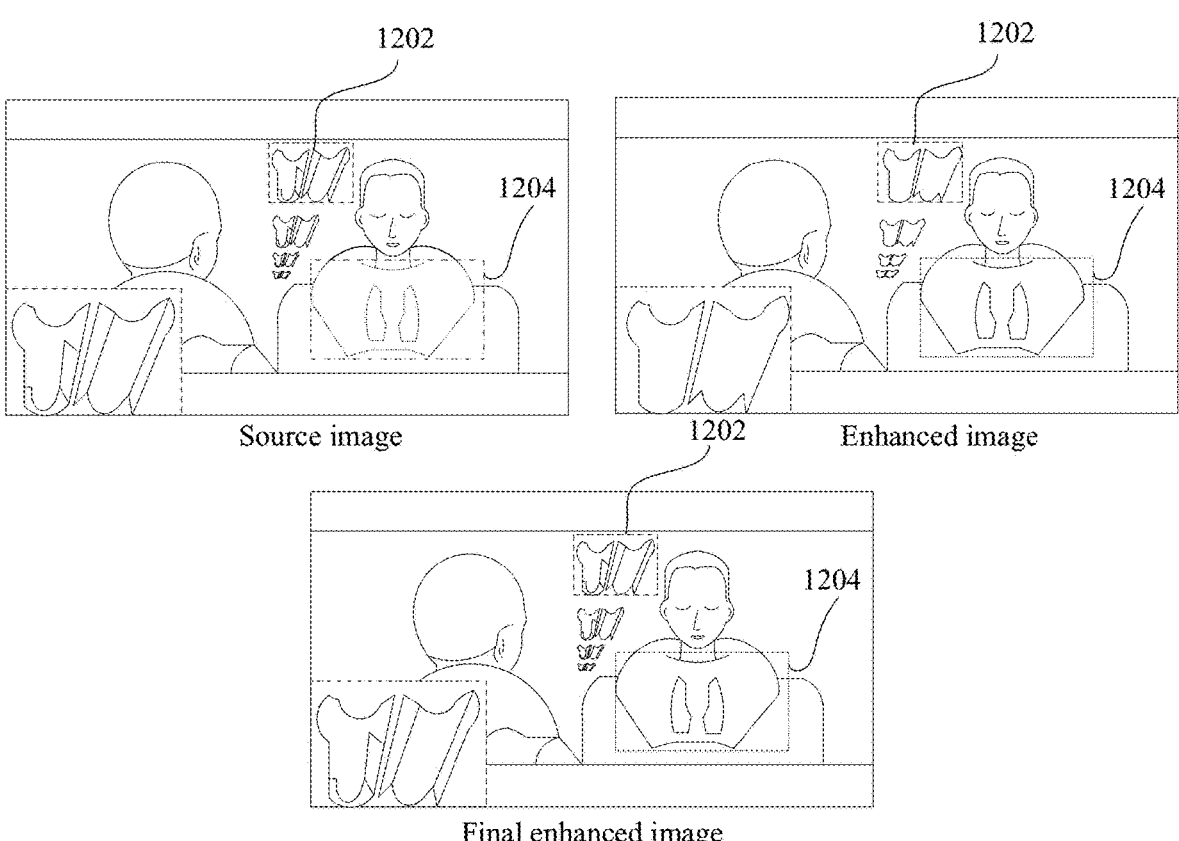
FIG. 12 is an effect comparison diagram of image processing according to some embodiments.

In some embodiments, as shown in FIG. 12, an effect comparison image undergone the image processing is provided. It can be learned that, for a bright region 1202 (an enlarged image of the bright region 1202 is provided at the left sides of the source image, the enhanced image, and the final enhanced image in FIG. 12), dark details (represented by lines in the bright region) of the bright region of the source image does not exist in the enhanced image obtained by enhancement. In other words, excessive enhancement leads to a loss of dark details. In the final enhanced image, the dark details in the bright region of the source image are remained. In other words, compared with the enhanced image, the final enhanced image has significantly richer and more prominent dark details in the bright region 1202. For a medium-lightness region 1204, lightness of the medium-lightness region in the source image is not obvious (a dotted line is used for representing the non-obvious lightness in the source image), and visual effect of the medium-lightness region in the enhanced image after enhancement is better. In the final enhanced image, the medium-lightness region with a better visual effect after enhancement is remained. In other words, compared with the source image, the medium-lightness region of the final enhanced image has a better visual effect, a higher contrast, and is clearer.

Figure 13:
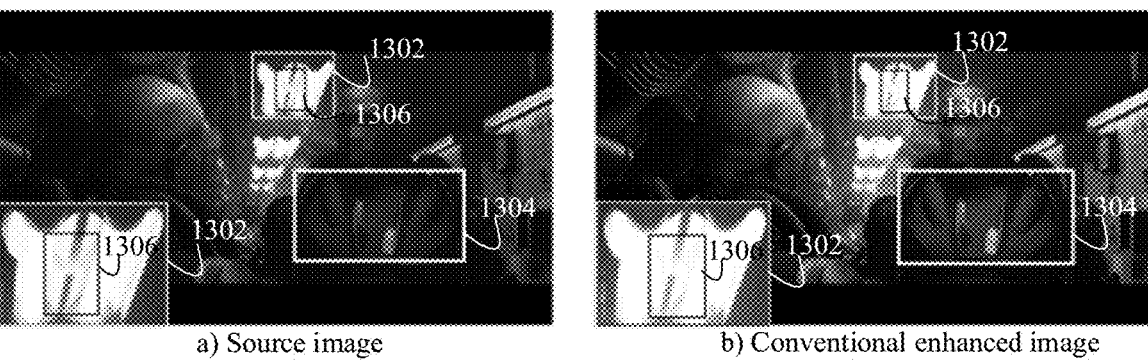
FIG. 13 is an effect comparison diagram of image processing according to some embodiments.

FIG. 13 shows an effect comparison image undergone the image processing in some embodiments. It can be learned that, compared with a conventional enhanced image, dark details (existing in a region 1306 marked by a dark box in FIG. 13) are significantly richer and more prominent in a bright region 1302 marked by a white box (an enlarged image of the bright region 1302 is provided at the left side of the source image, the conventional enhanced image, and the final enhanced image in FIG. 13) in the final enhanced image. Compared with the source image, the medium-lightness region 1304 marked by the white box in the final enhanced image has a better visual effect, a higher contrast, and is clearer. In conclusion, the final enhanced image combines advantages of the source image and the conventional enhanced image, and has a better overall and local look.

The use of a pixel-by-pixel local fusion factor allows each region and each pixel to use a unique fusion value, so that more flexible image fusion can be implemented; and performing adaptive fusion weight calculation based on an image attribute (such as lightness, contrast, and variation) and an enhancement varying trend (such as loss of details, and darkening or lightening of a color) but not implementing designing depending on experience can achieve more intelligent fusion. In this way, image quality of the final enhancement output image has a better effect of a focused image attribute than the enhanced image, and the overall image quality is significantly better than the source image while the beneficial characteristics of the source image and the enhanced image are remained, and in addition, adaptability to a plurality of image quality attributes is achieved, thereby improving availability in a wide range.

It is to be understood that, although the operations in the foregoing embodiments are displayed in sequence as indicated by arrows, these operations are not necessarily performed in sequence as indicated by arrows. Unless otherwise explicitly specified, the execution sequence of these operations is not strictly limited, and the operations may be performed in other sequences. Moreover, at least part of the operations in the foregoing embodiments may include a plurality of operations or a plurality of stages. The operations or stages are not necessarily performed at the same moment but may be performed at different moments. Execution of these operations or stages is not necessarily sequentially performed, but may be performed alternately with other operations or at least part of operations or stages in other operations.

Based on the same inventive concept, some embodiments further provide an image processing apparatus for implementing the foregoing image processing method. An implementation for resolving problems provided in the apparatus is similar to the implementation described in the foregoing method. Therefore, reference may be made to the foregoing limitations to the image processing method, for specific limitations of the following one or more image processing apparatus embodiments, which is not limited herein.

Figure 14:
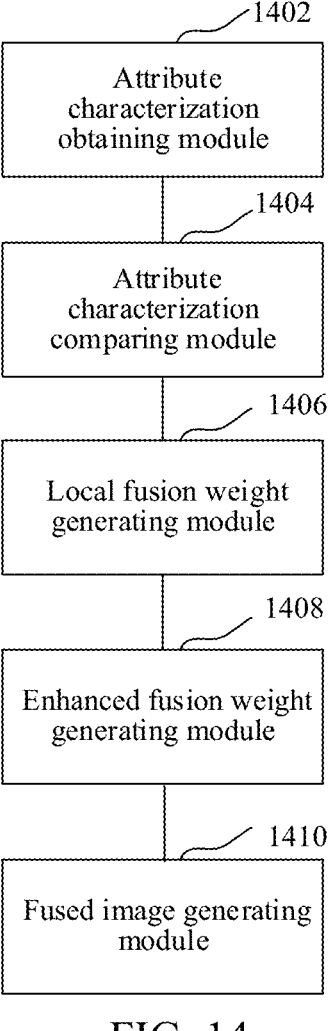
FIG. 14 is a block diagram of a structure of an image processing apparatus according to some embodiments.

In some embodiments, as shown in FIG. 14, an image processing apparatus is provided, including: an attribute characterization obtaining module 1402, an attribute characterization comparing module 1404, a local fusion weight generating module 1406, an enhanced fusion weight generating module 1408, and a fused image generating module 1410.

The attribute characterization obtaining module 1402 is configured to obtain an attribute characterization of a source image and an attribute characterization of an enhanced image, the enhanced image being obtained by enhancing the source image.

The attribute characterization comparing module 1404 is configured to compare the attribute characterization of the source image with the attribute characterization of the enhanced image, to obtain attribute differences between at least part of pixel positions in the source image and the at least part of pixel positions in the enhanced image.

The local fusion weight generating module 1406 is configured to generate local fusion weights of the at least part of pixel positions in the source image based on the attribute differences and the attribute characterization of the enhanced image.

The enhanced fusion weight generating module 1408 is configured to determine enhanced fusion weights of the at least part of pixel positions in the enhanced image, a determined enhanced fusion weight of at least one pixel position being negatively correlated with a local fusion weight of the same pixel position in the source image.

The fused image generating module 1410 is configured to generate a fused image of the source image and the enhanced image.

The foregoing image processing apparatus obtains the attribute characterization of the source image and the attribute characterization of the enhanced image, compares the attribute characterization of the source image with the attribute characterization of the enhanced image to obtain an attribute varying trend from the source image to the enhanced image, so as to obtain attribute differences between at least part of pixel positions of the source image and the at least part of pixel positions of the enhanced image, and performs adaptive fusion weight calculation based on the attribute differences of the at least part of pixel positions and the attribute characterization of the enhanced image, to generate local fusion weights of the at least part of pixel positions in the source image, so that enhanced fusion weights of the at least part of pixel positions in the enhanced image can be determined, to generate the fused image of the source image and the enhanced image. In the whole process, the local fusion weight is generated according to the attribute varying trend from the source image to the enhanced image. Image fusion is implemented by using the local fusion weight of each pixel, so that enhancement effect is improved.

In some embodiments, the attribute characterization comparing module is further configured to compare the attribute value of each pixel position in the attribute characterization of the source image with the attribute value of the same pixel position in the attribute characterization of the enhanced image, to obtain a differential attribute value of each pixel position in the different attribute characterizations. Attribute values of the at least part of pixel positions in the differential attribute characterization characterize the attribute differences between the at least part of pixel positions of the source image and the at least part of pixel positions of the enhanced image.

In some embodiments, the attribute characterization comparing module is further configured to map the differential attribute value of each pixel position in the different attribute characterizations to a preset attribute value range, to obtain an attribute difference of each pixel position in the different attribute characterizations, and generate a differential attribute characterization based on the attribute difference of each pixel position in the different attribute characterizations. The attribute value of each pixel position in the differential attribute characterization is the attribute difference of the corresponding pixel position.

In some embodiments, the attribute characterization comparing module is further configured to, for the differential attribute value of each pixel position in the different attribute characterizations, map the differential attribute value to a lower limit of the preset attribute value range in a case that the differential attribute value is smaller than the preset differential attribute threshold, to obtain an attribute difference of the pixel position corresponding to the differential attribute value, and map the differential attribute value to the preset attribute value range in a positively correlated mapping manner in a case that the differential attribute value is not smaller than the preset differential attribute threshold, to obtain an attribute difference of the pixel position corresponding to the differential attribute value.

In some embodiments, the at least part of pixel positions includes a part of pixel positions that form a labeled region, an attribute value of each pixel position in the labeled region in the attribute characterization of the enhanced image meets a labeled region recognition condition. A pixel value of each pixel position in a non-labeled region of the fused image is equal to a pixel value of the same pixel position in the enhanced image.

In some embodiments, the labeled region recognition condition includes: pixel positions in the labeled region in the attribute characterization of the enhanced image constitutes a connected domain, and an attribute value of each pixel position in the connected domain in the attribute characterization of the enhanced image falls within a preset labeling attribute value range.

In some embodiments, local fusion weights of pixel positions in a non-labeled region of the source image are 0, enhanced fusion weights of pixel positions in the non-labeled region of the enhanced image are determined based on the local fusion weights of same pixel positions in the source image. The fused image generating module is further configured to, for each pixel position in the source image and the same pixel position in the enhanced image, separately perform weighted fusion on the pixel value of the pixel position in the source image and the pixel value of the same pixel position in the enhanced image based on a local fusion weight and an enhanced fusion weight of the pixel position, to obtain a fused image.

In some embodiments, the fused image generating module is further configured to, for each pixel position in a labeled region, perform weighted fusion on a pixel value of the pixel position in the labeled region of the source image and a pixel value of the pixel position in the labeled region of the enhanced image based on the corresponding local fusion weight and enhanced fusion weight of the pixel position in the labeled region, to form a pixel value of the pixel position in the labeled region of the fused image, and use the pixel value of each pixel position in a non-labeled region of the enhanced image as a pixel value of the same pixel position in a non-labeled region of the fused image.

In some embodiments, the local fusion weight generating module is further configured to perform edge-preserving filtering on the attribute characterization of the enhanced image, to obtain a smoothed attribute characterization of the enhanced image, and generate local fusion weights of the at least part of pixel positions in the source image based on attribute differences and attribute values of the at least part of pixel positions in the smoothed attribute characterization.

In some embodiments, the local fusion weight generating module is further configured to, for each of the at least part of pixel positions, perform fusion on an attribute difference of the pixel position and an attribute value of the pixel position in the smoothed attribute characterization, to generate a local fusion weight of the pixel position.

In some embodiments, the local fusion weight generating module is further configured to obtain a variation stretch factor and an attribute stretch factor, perform weight adjustment on the attribute difference of the pixel position based on the variation stretch factor to obtain an attribute difference weight, perform weight adjustment on the attribute value of the pixel position in the smoothed attribute characterization based on the attribute stretch factor to obtain an attribute value weight, and perform fusion on the attribute difference weight and the attribute value weight to generate a local fusion weight of the pixel position.

In some embodiments, the attribute differences of the at least part of pixel positions include image attribute differences in at least two image attributes of at least part of pixel positions. The attribute characterization of the enhanced image includes image attribute characterizations of at least two image attributes of the enhanced image. The local fusion weight generating module is further configured to, for each of the at least two image attributes, generate attribute fusion weights of the image attribute of the at least part of pixel positions based on image attribute differences in the image attribute of the at least part of pixel positions and the image attribute characterization of the image attribute of the enhanced image, and for each of the at least part of pixel positions, perform fusion on attribute fusion weights of at least two image attributes corresponding to the pixel position, to generate the local fusion weight of the pixel position.

All or part of the modules in the foregoing image processing apparatus may be implemented through software, hardware, or a combination thereof. Each of the foregoing modules may be embedded in hardware form or independent of the processor in the computer device, or may be stored in software form in the memory in the computer device so that the processor may be called to perform the operations corresponding to each of the foregoing modules.

In some embodiments, a computer device is provided. The computer device may be a server. A diagram of an internal structure of the computer device may be shown as FIG. 15. The computer device includes a processor, a memory, an input/output interface (I/O for short), and a communication interface. The processor, the memory, and the input/output interface are connected via a system bus, and the communication interface is connected to the system bus via the input/output interface. The processor of the computer device is configured to provide computation and control abilities. The memory of the computer device includes a non-volatile storage medium and an internal memory. The non-volatile storage medium has an operating system, computer-readable instructions, and a database stored thereon. The internal memory provides a running environment for the operating system and the computer-readable instructions on the non-volatile storage medium. The database of the computer device is configured to store data such as a source image and an enhanced image. The input/output interface of the computer device is configured for information exchange between the processor and an external device. The communication interface of the computer device is configured to be connected to and communicate with an external terminal via a network. The computer-readable instructions, when executed by a processor, implement an image processing method.

In some embodiments, a computer device is provided. The computer device may be a terminal. A diagram of an internal structure of the computer device is shown as FIG. 16. The computer device includes a processor, a memory, an input/output interface, a communication interface, a display unit, and an input means. The processor, the memory, and the input/output interface are connected by a system bus, and the communication interface, the display unit, and the input means are connected to the system bus via the input/output interface. The processor of the computer device is configured to provide computation and control abilities. The memory of the computer device includes a non-volatile storage medium and an internal memory. The non-volatile storage medium has an operating system and computer-readable instructions stored thereon. The internal memory provides a running environment for the operating system and the computer-readable instructions on the non-volatile storage medium. The input/output interface of the computer device is configured for information exchange between the processor and an external device. The communication interface of the computer device is configured for wired or wireless communication with an external terminal. The wireless communication may be implemented based on Wi-Fi, a mobile cellular network, near-field communication (NFC), or another technology. The computer-readable instructions, when executed by a processor, implement an image processing method. The display unit of the computer device is configured to form a visible image, and may be a display screen, a projection apparatus, or a virtual reality imaging device. The display screen may be a liquid crystal display or an e-ink display screen. The input means of the computer device may be a touch layer covering the display screen, or may be a button, a trackball, or a touchpad provided on a housing of the computer device, or may be an external keyboard, touchpad, mouse, or the like.

Figure 15:
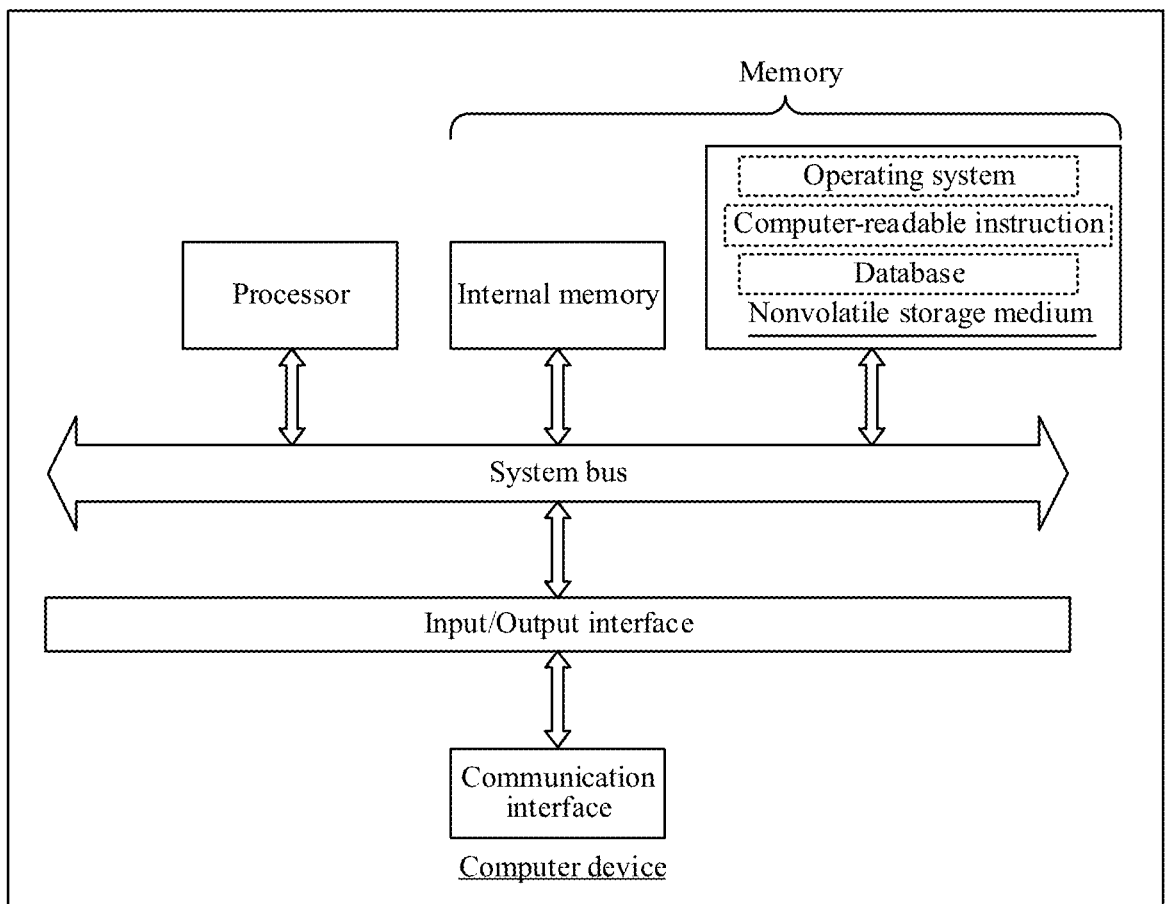
FIG. 15 is a diagram of an internal structure of a computer device according to some embodiments.
Figure 16:
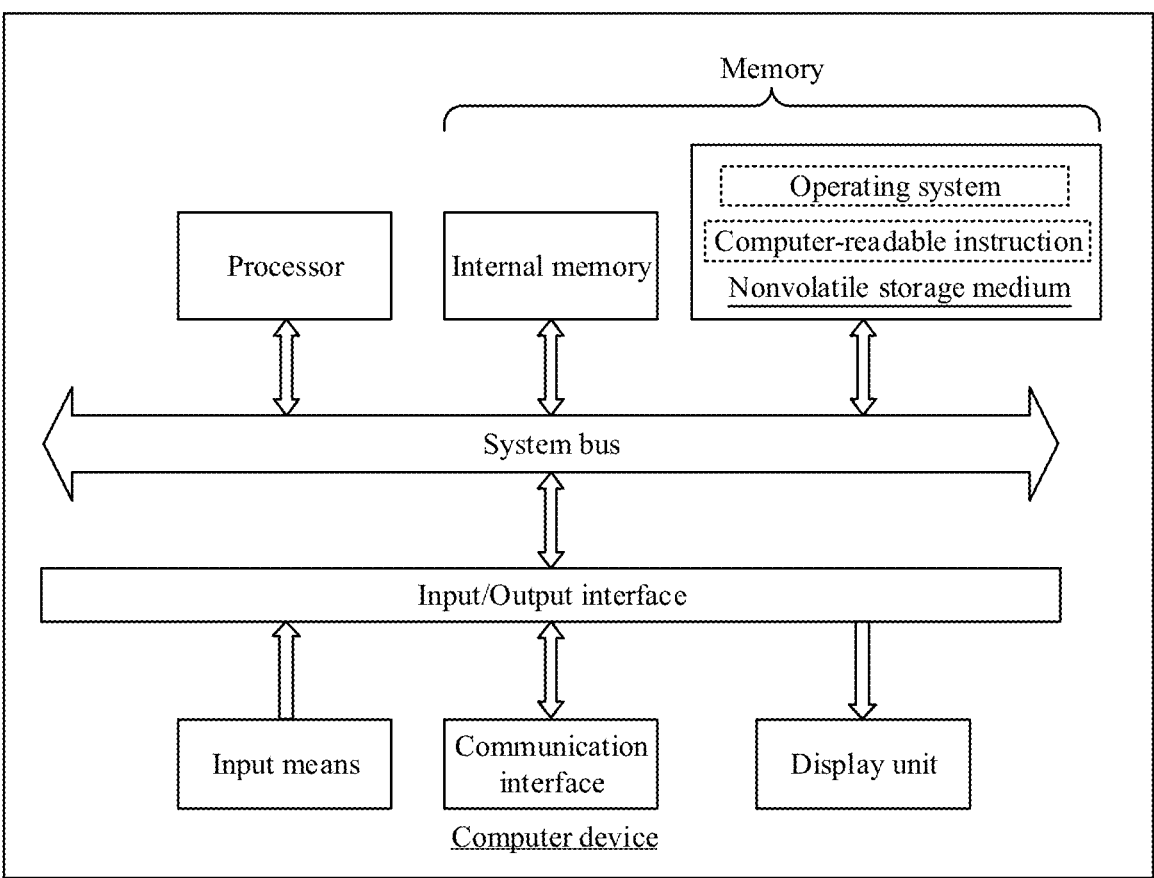
FIG. 16 is a diagram of an internal structure of a computer device according to some embodiments.

A person skilled in the art may understand that the structures shown in FIG. 15 and FIG. 16 are merely block diagrams of partial structures related to a solution in some embodiments, and do not constitute a limitation to the computer device to which the solution in some embodiments is applied. In some embodiments, the computer device may include more or fewer components than those shown in the figure, or have some components combined, or have a different component arrangement.

In some embodiments, a computer device is further provided, which includes a memory and a processor. The memory has computer-readable instructions stored herein, and the processor implements operations in the foregoing method embodiments when executing the computer-readable instructions.

In some embodiments, a computer-readable storage medium is provided, having computer-readable instructions stored thereon. When being executed by a processor, the computer-readable instructions implement operations in the foregoing method embodiments.

In some embodiments, a computer program product is provided, including computer-readable instructions. When being executed by a processor, the computer-readable instructions implement operations in the foregoing method embodiments.

A person of ordinary skill in the art may understand that all or some of procedures of the method in the foregoing embodiments may be implemented by computer-readable instructions instructing relevant hardware. The computer-readable instructions may be stored on a non-volatile computer-readable storage medium. When the computer-readable instructions are executed, the procedures of the foregoing method embodiments may be implemented. References to the memory, the database, or another medium used in the foregoing embodiments provided in some embodiments may all include at least one of a non-volatile or a volatile memory. The non-volatile memory may include a read-only memory (ROM), a tape, a floppy disk, a flash memory, an optical memory, a high-density embedded non-volatile memory, a resistive random-access memory (Re-RAM), a magnetoresistive random access memory (MRAM), a ferroelectric random access memory (FRAM), a phase change memory (PCM), a graphene memory, or the like. The volatile memory may include a random access memory (RAM) or an external cache. As description but not limitation, the RAM may be in a plurality of forms, for example, a static random access memory (SRAM) or a dynamic random access memory (DRAM). The database in the foregoing embodiments may include at least one of a relational database or a non-relational database. The non-relational database may include a blockchain-based distributed database or the like, and is not limited herein. The processors in the foregoing embodiments may be a general processor, a central processing unit, a graphics processor, a digital signal processor, a programmable logic device, a data processing logic device based on quantum computing, or the like, and is not limited herein.

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described herein.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. An image processing method, performed by a computer device, comprising:
   obtaining an attribute characterization of a source image and an attribute characterization of an enhanced image, the enhanced image being obtained by enhancing the source image;
   comparing the attribute characterization of the source image with the attribute characterization of the enhanced image to obtain attribute differences between at least part of pixel positions in the source image and corresponding at least part of pixel positions in the enhanced image;
   determining local fusion weights of the at least part of pixel positions in the source image based on the attribute differences and the attribute characterization of the enhanced image;
   determining enhanced fusion weights of the at least part of pixel positions in the enhanced image, a determined enhanced fusion weight of at least one pixel position being negatively correlated with a local fusion weight of the same pixel position in the source image; and
   fusing the source image and the enhanced image to obtain a fused image.

2. The image processing method according to claim 1, wherein comparing the attribute characterization of the source image with the attribute characterization of the enhanced image comprises:
   comparing an attribute value of each pixel position in the attribute characterization of the source image with an attribute value of a corresponding pixel position in the attribute characterization of the enhanced image to obtain a differential attribute value of each pixel position in the two attribute characterizations; and
   generating a differential attribute characterization based on the differential attribute value of each pixel position in the two attribute characterizations, attribute values of the at least part of pixel positions in the differential attribute characterization characterizing attribute differences between the at least part of pixel positions of the source image and the corresponding at least part of pixel positions of the enhanced image.

3. The image processing method according to claim 2, wherein generating the differential attribute characterization comprises:
   mapping the differential attribute value of each pixel position in the two attribute characterizations to a preset attribute value range to obtain an attribute difference of each pixel position in the two attribute characterizations; and
   generating the differential attribute characterization based on the attribute difference of each pixel position in the two attribute characterizations, the attribute value of each pixel position in the differential attribute characterization being the attribute difference.

4. The image processing method according to claim 3, wherein mapping the differential attribute value comprises:

for the differential attribute value of each pixel position in two different attribute characterizations, mapping the differential attribute value to a lower limit of the preset attribute value range based on the differential attribute value being smaller than a preset differential attribute threshold to obtain the attribute difference of the pixel position corresponding to the differential attribute value; and mapping the differential attribute value to the preset attribute value range in a positively correlated mapping manner based on the differential attribute value not being smaller than the preset differential attribute threshold to obtain the attribute difference of the pixel position corresponding to the differential attribute value.

5. The image processing method according to claim 1, wherein the at least part of pixel positions comprises a part of pixel positions that forms a labeled region, and an attribute value of each pixel position in the labeled region in the attribute characterization of the enhanced image meets a labeled region recognition condition; and a pixel value of each pixel position in a non-labeled region of the fused image is equal to a pixel value of the same pixel position in the enhanced image.

6. The image processing method according to claim 5, wherein the labeled region recognition condition comprises: pixel positions in the labeled region in the attribute characterization of the enhanced image constitute a connected domain, and an attribute value of each pixel position in the connected domain of the attribute characterization of the enhanced image falls within a preset labeling attribute value range.

7. The image processing method according to claim 5, wherein the local fusion weight of each pixel position in the non-labeled region of the source image is 0; the enhanced fusion weight of each pixel position in the non-labeled region of the enhanced image is determined based on the local fusion weights of the same pixel position in the source image; and wherein fusing the source image and the enhanced image comprises:

for each pixel position in the source image and a corresponding pixel position in the enhanced image, performing weighted fusion on a pixel value of the pixel position in the source image and the corresponding pixel position in the enhanced image based on the local fusion weight and the enhanced fusion weight of the pixel position to obtain the fused image.

8. The image processing method according to claim 5, wherein the fusing the source image and the enhanced image comprises:

for each pixel position in the labeled region, performing weighted fusion on a pixel value of the pixel position in the labeled region of the source image and a pixel value of the pixel position in the labeled region of the enhanced image based on the local fusion weight and the enhanced fusion weight corresponding to the pixel position in the labeled region to form a pixel value of the pixel position in the labeled region of the fused image; and using a pixel value of each pixel position in the non-labeled region of the enhanced image as a pixel value of a corresponding pixel position in the non-labeled region of the fused image.

9. The image processing method according to claim 1, wherein determining the local fusion weights of the at least part of pixel positions in the source image based on the attribute differences and the attribute characterization of the enhanced image comprises:

performing edge-preserving filtering on the attribute characterization of the enhanced image to obtain a smoothed attribute characterization of the enhanced image; and generating the local fusion weights of the at least part of pixel positions in the source image based on the attribute differences and attribute values of the at least part of pixel positions in the smoothed attribute characterization.

10. The image processing method according to claim 9, wherein generating the local fusion weights of the at least part of pixel positions in the source image based on the attribute differences and the attribute values of the at least part of pixel positions in the smoothed attribute characterization comprises:

for each of the at least part of pixel positions, performing fusion on an attribute difference of the pixel position and an attribute value of the pixel position in the smoothed attribute characterization to generate a local fusion weight of the pixel position.

11. The image processing method according to claim 10, wherein performing fusion on the attribute difference of the pixel position and the attribute value of the pixel position in the smoothed attribute characterization comprises:

obtaining a variation stretch factor and an attribute stretch factor;

performing weight adjustment on the attribute difference of the pixel position based on the variation stretch factor to obtain an attribute difference weight;

performing weight adjustment on the attribute value of the pixel position in the smoothed attribute characterization based on the attribute stretch factor to obtain an attribute value weight; and performing fusion on the attribute difference weight and the attribute value weight to generate a local fusion weight of the pixel position.

12. The image processing method according to claim 1, wherein the attribute differences comprise image attribute differences in at least two image attributes of the at least part of pixel positions, the attribute characterization of the enhanced image comprises image attribute characterizations of the at least two image attributes of the enhanced image; and wherein determining the local fusion weights of the at least part of pixel positions in the source image based on the attribute differences and the attribute characterization of the enhanced image comprises:

for each of the at least two image attributes, generating attribute fusion weights of the image attribute of the at least part of pixel positions based on image attribute differences in the image attribute of the at least part of pixel positions and an image attribute characterization of the image attribute of the enhanced image; and for each of the at least part of pixel positions, performing fusion on attribute fusion weights of the at least two image attributes corresponding to the pixel position to generate a local fusion weight of the pixel position.

13. The image processing method according to claim 1, wherein for each of the at least part of pixel positions, a pixel value of the pixel position of the fused image is obtained by performing weighted fusion on a pixel value of the pixel position in the source image and a pixel value of the pixel position in the enhanced image based on the local fusion weight and the enhanced fusion weight of the pixel position.

14. An image processing apparatus, comprising:

at least one memory configured to store program code; and at least one processor configured to read the program code and operate as instructed by the program code, the program code comprising:

attribute characterization obtaining code configured to cause at least one of the at least one processor to obtain an attribute characterization of a source image and an attribute characterization of an enhanced image, the enhanced image being obtained by enhancing the source image;

attribute characterization comparing code configured to cause at least one of the at least one processor to compare the attribute characterization of the source image with the attribute characterization of the enhanced image to obtain attribute differences between at least part of pixel positions in the source image and corresponding at least part of pixel positions in the enhanced image;

local fusion weight generating code configured to cause at least one of the at least one processor to determine local fusion weights of the at least part of pixel positions in the source image based on the attribute differences and the attribute characterization of the enhanced image;

enhanced fusion weight generating code configured to cause at least one of the at least one processor to determine enhanced fusion weights of the at least part of pixel positions in the enhanced image, a determined enhanced fusion weight of at least one pixel position being negatively correlated with a local fusion weight of the same pixel position in the source image; and fused image generating code configured to cause at least one of the at least one processor to generate a fused image of the source image and the enhanced image.

15. The image processing apparatus according to claim 14, wherein the attribute characterization comparing code is further configured to cause at least one of the at least one processor to:

compare the attribute characterization of the source image with the attribute characterization of the enhanced image comprises:

compare an attribute value of each pixel position in the attribute characterization of the source image with an attribute value of a corresponding pixel position in the attribute characterization of the enhanced image to obtain a differential attribute value of each pixel position in the two attribute characterizations; and generate a differential attribute characterization based on the differential attribute value of each pixel position in the two attribute characterizations, attribute values of the at least part of pixel positions in the differential attribute characterization characterizing attribute differences between the at least part of pixel positions of the source image and the corresponding at least part of pixel positions of the enhanced image.

16. The image processing apparatus according to claim 15, wherein the attribute characterization comparing code is further configured to cause at least one of the at least one processor to:

map the differential attribute value of each pixel position in the two attribute characterizations to a preset attribute value range to obtain an attribute difference of each pixel position in the two attribute characterizations; and generate the differential attribute characterization based on the attribute difference of each pixel position in the two attribute characterizations, the attribute value of each pixel position in the differential attribute characterization being the attribute difference.

17. The image processing apparatus according to claim 16, wherein the attribute characterization comparing code is further configured to cause at least one of the at least one processor to:

for the differential attribute value of each pixel position in two different attribute characterizations, mapping the differential attribute value to a lower limit of the preset attribute value range based on the differential attribute value being smaller than a preset differential attribute threshold to obtain the attribute difference of the pixel position corresponding to the differential attribute value; and mapping the differential attribute value to the preset attribute value range in a positively correlated mapping manner based on the differential attribute value not being smaller than the preset differential attribute threshold to obtain the attribute difference of the pixel position corresponding to the differential attribute value.

18. The image processing apparatus according to claim 14, wherein the at least part of pixel positions comprises a part of pixel positions that forms a labeled region, and an attribute value of each pixel position in the labeled region in the attribute characterization of the enhanced image meets a labeled region recognition condition; and a pixel value of each pixel position in a non-labeled region of the fused image is equal to a pixel value of the same pixel position in the enhanced image.

19. The image processing apparatus according to claim 18, wherein the labeled region recognition condition comprises: pixel positions in the labeled region in the attribute characterization of the enhanced image constitute a connected domain, and an attribute value of each pixel position in the connected domain of the attribute characterization of the enhanced image falls within a preset labeling attribute value range.

20. A non-transitory computer-readable medium storing computer code which, when executed by at least one processor, causes the at least one processor to at least:

obtain an attribute characterization of a source image and an attribute characterization of an enhanced image, the enhanced image being obtained by enhancing the source image;

compare the attribute characterization of the source image with the attribute characterization of the enhanced image to obtain attribute differences between at least part of pixel positions in the source image and corresponding at least part of pixel positions in the enhanced image;

determine local fusion weights of the at least part of pixel positions in the source image based on the attribute differences and the attribute characterization of the enhanced image;

determine enhanced fusion weights of the at least part of pixel positions in the enhanced image, a determined enhanced fusion weight of at least one pixel position being negatively correlated with a local fusion weight of the same pixel position in the source image; and fuse the source image and the enhanced image to obtain a fused image.

\* \* \* \* \*